(12) United States Patent
Tanaka et al.

(10) Patent No.: US 12,442,983 B2
(45) Date of Patent: Oct. 14, 2025

(54) WAVELENGTH MULTIPLEXER/DEMULTIPLEXER

(71) Applicant: SUMITOMO ELECTRIC INDUSTRIES, LTD., Osaka (JP)

(72) Inventors: Masato Tanaka, Osaka (JP); Hidehisa Tazawa, Osaka (JP); Eiichiro Yamada, Osaka (JP); Masato Furukawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 356 days.

(21) Appl. No.: 17/983,602

(22) Filed: Nov. 9, 2022

(65) Prior Publication Data

US 2023/0168432 A1    Jun. 1, 2023

(30) Foreign Application Priority Data

Nov. 26, 2021    (JP) ................................ 2021-192121

(51) Int. Cl.
     *G02B 6/293*      (2006.01)
     *G02B 6/12*      (2006.01)
     *H04Q 11/00*      (2006.01)

(52) U.S. Cl.
     CPC ..... *G02B 6/29365* (2013.01); *G02B 6/12007* (2013.01); *G02B 6/293* (2013.01);
     (Continued)

(58) Field of Classification Search
     CPC ........................... G02B 6/12007; G02B 6/293; G02B 6/29365; G02B 6/2938; H04Q 11/0005; H04Q 2011/0009
See application file for complete search history.

(56) References Cited

U.S. PATENT DOCUMENTS 5,859,717 A * 1/1999 Scobey .............. G02B 6/29367
     398/79
6,301,407 B1 * 10/2001 Donaldson ......... G02B 6/29365
     385/24

(Continued)

FOREIGN PATENT DOCUMENTS

| CN | 202649522 U | | 1/2013 | |
|---|---|---|---|---|
| JP | 2019-186551 A | | 10/2019 | |
| KR | 20080020075 A | * | 3/2008 | ............. G02B 6/293 |

OTHER PUBLICATIONS

English Translation for KR-20080020075-A, 11 pages. (Year: 2008).*

(Continued)

*Primary Examiner* — Daniel Petkovsek
(74) *Attorney, Agent, or Firm* — Oliff PLC

(57) ABSTRACT

A wavelength multiplexer/demultiplexer includes a first collimator, M-number of second collimators, M-number of wavelength selective filters, and a base plate. Each of the wavelength selective filters includes a substrate having optical transparency and a multilayer film. The substrate includes a first main surface and a second main surface, and a bottom surface facing a placement surface of the base plate. The multilayer film is formed on the first main surface and transmits an optical signal in a specific transmission wavelength band and reflect an optical signal in a wavelength band other than the specific transmission wavelength band. Each of the wavelength selective filters is fixed to the placement surface by a cured adhesive. The cured adhesive is in contact with the bottom surface and is in non-contact with the multilayer film in at least one wavelength selective filter among the wavelength selective filters.

19 Claims, 28 Drawing Sheets

(52) U.S. Cl.
CPC ....... *G02B 6/2938* (2013.01); *H04Q 11/0005* (2013.01); *H04Q 2011/0009* (2013.01)

(56) References Cited

U.S. PATENT DOCUMENTS

| | | | | |
|---|---|---|---|---|
| 6,515,776 | B1 | 2/2003 | Naganuma | |
| 6,876,789 | B2 * | 4/2005 | Kagami | G02B 6/266 |
| | | | | 385/31 |
| 7,031,610 | B2 * | 4/2006 | Honda | G02B 6/2938 |
| | | | | 385/24 |
| 7,072,540 | B1 * | 7/2006 | Szapiel | G02B 27/62 |
| | | | | 385/24 |
| 7,212,343 | B1 * | 5/2007 | He | G02B 6/29383 |
| | | | | 359/619 |
| 7,215,853 | B2 * | 5/2007 | Morita | H04J 14/0201 |
| | | | | 385/20 |
| 9,563,065 | B2 * | 2/2017 | Yasui | G02B 6/4214 |
| 9,804,332 | B1 * | 10/2017 | Wang | G02B 6/29365 |
| 9,910,233 | B2 * | 3/2018 | Tamura | G02B 6/43 |
| 11,131,804 | B1 * | 9/2021 | He | H04J 14/0307 |
| 11,973,580 | B2 * | 4/2024 | Matiss | H04J 14/0294 |
| 2017/0131474 | A1 * | 5/2017 | Dannenberg | G02B 6/32 |
| 2018/0128983 | A1 * | 5/2018 | Huang | H04J 14/0256 |
| 2018/0220208 | A1 | 8/2018 | Gui et al. | |
| 2021/0199904 | A1 * | 7/2021 | Chang | G02B 6/29361 |

OTHER PUBLICATIONS

Honda et al., "Diffraction-compensated free-space WDM add-Drop module with thin-film filters", IEEE Photonics Technology Letters, (2003), vol. 15, No. 1, pp. 69-71.

* cited by examiner

WAVELENGTH MULTIPLEXER/DEMULTIPLEXER

CROSS REFERENCE TO RELATED APPLICATIONS

This application claims the benefit of priority based on Japanese Patent Application No. 2021-192121 filed on Nov. 26, 2021, and the entire contents of the Japanese patent application are incorporated herein by reference.

TECHNICAL FIELD

The present disclosure relates to a wavelength multiplexers/demultiplexer.

BACKGROUND

U.S. Pat. No. 6,515,776 discloses one example of a wavelength multiplexer/demultiplexer used in a wavelength multiplexing optical communication system or the like. The wavelength multiplexer/demultiplexer multiplexes a plurality of optical signals having wavelengths different from each other into a wavelength-multiplexed optical signal, or demultiplexes a wavelength-multiplexed optical signal including a plurality of optical signals having mutually different wavelengths into respective optical signals. U.S. Pat. No. 7,031,610 and a Non-Patent Document (Honda, et al. "Diffraction-compensated free-space WDM add-Drop module with thin-film filters", IEEE Photonics Technology Letters, Vol. 15, No. 1, p. 69) disclose other examples of the wavelength multiplexer/demultiplexer.

The wavelength multiplexer/demultiplexer includes a plurality of wavelength selective filters. Each of the filters includes a light-transmissive substrate and a multilayer film formed on a surface of the substrate. The multilayer film transmits only an optical signal having a predetermined transmission wavelength band. The wavelength selective filters are arranged in two rows on a base plate, for example, and are disposed so that the positions in the arrangement direction are alternated between the rows. For example, when a plurality of optical signals having different wavelengths are multiplexed, each optical signal is input to a wavelength selective filter from a corresponding collimator, and each optical signal transmitted through the wavelength selective filter is multiplexed with another optical signal while being reflected by a multilayer film of another wavelength selective filter.

SUMMARY

One aspect of the present disclosure provides a wavelength multiplexer/demultiplexer. The wavelength multiplexer/demultiplexer includes a first collimator, M-number (M is an integer of 2 or more) of second collimators, M-number of wavelength selective filters, and a base plate. The first collimator includes a first optical waveguide and a collimating lens optically coupled to an end portion of the first optical waveguide. Each of the M-number of second collimators includes a second optical waveguide and a collimating lens optically coupled to an end portion of the second optical waveguide. M-number of wavelength selective filters are configured to transmit optical signals in mutually differing transmission wavelength bands, and reflect optical signals in wavelength bands other than each transmission wavelength band. The base plate includes a placement surface on which the M-number of wavelength selective filters are placed. An optical path connecting the first collimator and a second collimator in a first place among the M-number of second collimators is configured to pass through a wavelength selective filter in a first place among the M-number of wavelength selective filters. An optical path connecting a wavelength selective filter in an mth (m=1, . . . , M−1) place among the M-number of wavelength selective filters and a second collimator in an (m+1)th place among the M-number of second collimators is configured to pass through a wavelength selective filter in an (m+1)th place among the M-number of wavelength selective filters. Each of the M-number of wavelength selective filters includes a substrate having optical transparency and a multilayer film. The substrate includes a first main surface and a second main surface opposite to each other in a first direction, and a bottom surface connecting the first main surface and the second main surface and facing the placement surface. The multilayer film is formed on the first main surface and is configured to transmit an optical signal in a specific transmission wavelength band and reflect an optical signal in a wavelength band other than the specific transmission wavelength band. Each of the M-number of wavelength selective filters is fixed to the placement surface by a cured adhesive. The cured adhesive is in contact with the bottom surface and is in non-contact with the multilayer film in at least one wavelength selective filter of the M-number of wavelength selective filters.

DETAILED DESCRIPTION

Figure 1:
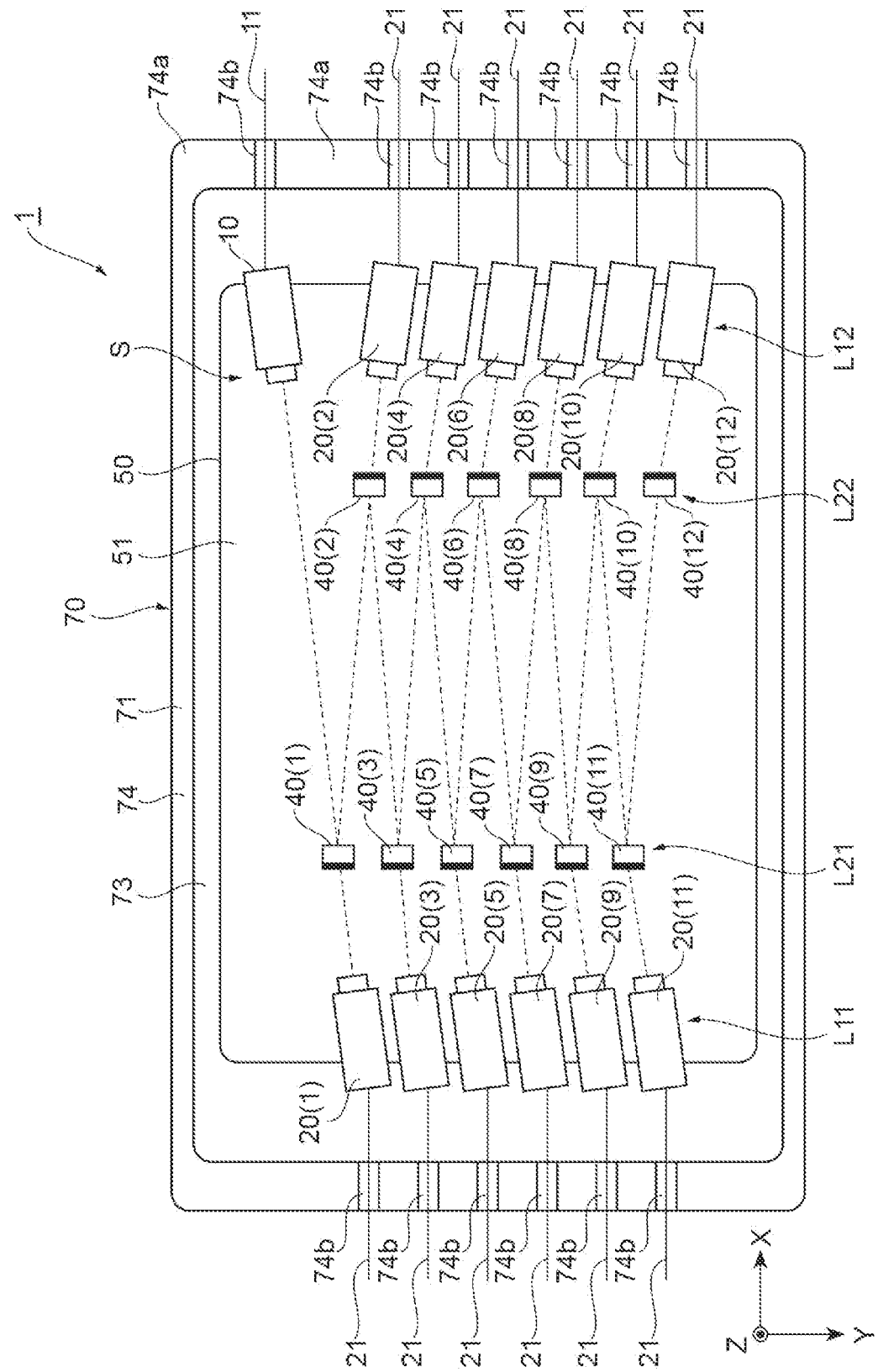
FIG. 1 is a schematic plan view of a wavelength multiplexer/demultiplexer according to a first embodiment.

Problem to be Solved by the Present Disclosure

In the conventional wavelength multiplexer/demultiplexer as described above, each wavelength selective filter is fixed to the base plate by, for example, a cured adhesive. When an environmental temperature changes in a state in which each wavelength selective filter is fixed to the base plate, the inclination of the multilayer film with respect to the optical signal incident on the wavelength selective filter may change. When the environmental temperature is lower than room temperature (for example, 25° C.), the multilayer film is inclined away from the base plate. When the environmental temperature is higher than room temperature, the multilayer film is inclined toward the base plate. As a result, the optical path of the reflected light from the multilayer film changes from the original optical path, and the insertion loss due to the wavelength selective filter increases.

Effect of the Present Disclosure

An object of the present disclosure is to provide a wavelength multiplexer/demultiplexer capable of suppressing an increase in insertion loss that occurs when the environmental temperature of a wavelength selective filter changes.

DESCRIPTION OF EMBODIMENTS OF THE PRESENT DISCLOSURE

First, the contents of the embodiments of the present disclosure will be listed and explained. A wavelength multiplexer/demultiplexer according to an embodiment of the present disclosure includes a first collimator, M-number (M is an integer of 2 or more) of second collimators, M-number of wavelength selective filters, and a base plate. The first collimator includes a first optical waveguide and a collimating lens optically coupled to an end portion of the first optical waveguide. Each of the M-number of second collimators includes a second optical waveguide and a collimating lens optically coupled to an end portion of the second optical waveguide. The M-number of wavelength selective filters configured to transmit optical signals in mutually differing transmission wavelength bands, and reflect optical signals in wavelength bands other than each transmission wavelength band. A base plate includes a placement surface on which the M-number of wavelength selective filters are placed. An optical path connecting the first collimator and a second collimator in a first place among the M-number of second collimators is configured to pass through a wavelength selective filter in a first place among the M-number of wavelength selective filters. An optical path connecting a wavelength selective filter in an mth (m=1, ..., M−1) place among the M-number of wavelength selective filters and a second collimator in an (m+1)th place among the M-number of second collimators is configured to pass through a wavelength selective filter in an (m+1)th place among the M-number of wavelength selective filters. Each of the M-number of wavelength selective filters includes a substrate having optical transparency and a multilayer film. The substrate includes a first main surface and a second main surface opposite to each other in a first direction and a bottom surface connecting the first main surface and the second main surface and facing the placement surface. The multilayer film is formed on the first main surface and being configured to transmit an optical signal in a specific transmission wavelength band and reflect an optical signal in a wavelength band other than the specific transmission wavelength band. Each of the M-number of wavelength selective filters is fixed to the placement surface by a cured adhesive. The cured adhesive is in contact with the bottom surface and is in non-contact with the multilayer film in at least one wavelength selective filter of the M-number of wavelength selective filters.

According to the above wavelength multiplexer/demultiplexer, in at least one wavelength selective filter among the M-number of wavelength selective filters, the cured adhesive is in contact with the bottom surface of the substrate of the wavelength selective filter and is in non-contact with the multilayer film. Since the cured adhesive is in non-contact with the multilayer film, the multilayer film is not bound to the placement surface of the base plate by the cured adhesive. Thus, stress generated in the multilayer film when thermal deformation of the substrate occurs due to a change in environmental temperature is reduced. As a result, in the wavelength multiplexer/demultiplexer, the inclination of the multilayer film when the environmental temperature changes is suppressed. Therefore, the optical path deviation of the optical signal reflected by the wavelength selective filter is less likely to occur in the above wavelength multiplexer/demultiplexer even when the environmental temperature changes, and an increase in insertion loss due to the wavelength selective filter can be suppressed.

In an embodiment, the substrate may include a first side surface and a second side surface opposite to each other in a second direction intersecting the first direction. In the at least one wavelength selective filter, the cured adhesive may be in contact with the first side surface and the second side surface. According to this embodiment, since the cured adhesive is in contact with the first side surface and the second side surface of the substrate as well as the bottom surface of the substrate, a contact area between the wavelength selective filter and the cured adhesive is increased, and the wavelength selective filter is more firmly fixed to the base plate by the cured adhesive. Therefore, even when a physical external force is applied to, for example, the wavelength selective filter, deviation of the position and the direction of the wavelength selective filter is less likely to occur, and an increase in insertion loss due to the wavelength selective filter can be suppressed.

In an embodiment, the first main surface may include an exposed region in which the multilayer film is not formed. The cured adhesive may be in contact with the exposed region. In this embodiment, the first main surface may include a first part opposite to the second main surface in the first direction, and a second part inclined with respect to the first part and the bottom surface and connecting the first part and the bottom surface. The second part may include the exposed region. According to this embodiment, since the cured adhesive is in contact with not only the bottom surface of the substrate but also a part of the first main surface, a contact area between the wavelength selective filter and the cured adhesive is increased, and the wavelength selective filter is more firmly fixed to the base plate by the cured adhesive. Therefore, even when a physical external force is applied to, for example, the wavelength selective filter, deviation of the position and the direction of the wavelength selective filter is less likely to occur, and an increase in insertion loss due to the wavelength selective filter can be suppressed.

In the above embodiment, a part of the cured adhesive in contact with the exposed region may be positioned to be separated from a center of the first main surface by 300 μm or more when viewed in the first direction. According to this embodiment, since the part of the cured adhesive that is in contact with the exposed region is positioned away from the center of the first main surface to some extent, it is possible to suppress the optical signal transmitted through the wavelength selective filter from being blocked by the cured adhesive.

In an embodiment, each of the M-number of wavelength selective filters may include an antireflection film formed on the second main surface and configured to prevent an optical signal from being reflected by the second main surface. In the at least one wavelength selective filter, the cured adhesive may be in contact with a surface of the antireflection film facing the placement surface. According to this embodiment, since the cured adhesive is in contact with not only the bottom surface of the substrate but also the surface of the antireflection film facing the placement surface, the contact area between the wavelength selective filter and the cured adhesive is increased, and the wavelength selective filter is more firmly fixed to the base plate by the cured adhesive. Therefore, even when a physical external force is applied to, for example, the wavelength selective filter, deviation of the position and the direction of the wavelength selective filter is less likely to occur, and an increase in insertion loss due to the wavelength selective filter can be suppressed.

In an embodiment, in the at least one wavelength selective filter, the cured adhesive may be in contact with a surface of the antireflection film opposite to the second main surface. According to this embodiment, since the cured adhesive is in contact with not only the bottom surface of the substrate but also the surface opposite to the second main surface of the antireflection film, the contact area between the wavelength selective filter and the cured adhesive is increased, and the wavelength selective filter is more firmly fixed to the base plate by the cured adhesive. Therefore, even when a physical external force is applied to, for example, the wavelength selective filter, deviation of the position and the direction of the wavelength selective filter is less likely to occur, and an increase in insertion loss due to the wavelength selective filter can be suppressed.

In the above embodiment, a part of the cured adhesive in contact with the antireflection film may be positioned to be separated from a center of the second main surface by 300 μm or more when viewed in the first direction. According to this embodiment, since the part of the cured adhesive that is in contact with the antireflection film is positioned away from the center of the second main surface to some extent, it is possible to suppress the optical signal transmitted through the wavelength selective filter from being blocked by the cured adhesive.

In an embodiment, the cured adhesive may be a cured material of an adhesive including an ultraviolet curable resin. According to this embodiment, the adhesive can be quickly cured by irradiating the adhesive with ultraviolet rays. Therefore, deviation of the position and direction of the wavelength selective filter is less likely to occur in the process of curing the adhesive, and an increase in insertion loss due to the wavelength selective filter can be suppressed.

In an embodiment, the cured adhesive may be a cured material of an adhesive including a silica filler. According to this embodiment, since silica is a material having a relatively small coefficient of linear expansion, thermal deformation of the cured adhesive due to a change in environmental temperature is suppressed. Therefore, even when the environmental temperature changes, the deviation of the position and direction of the wavelength selective filter fixed by the cured adhesive is less likely to occur, and an increase in insertion loss due to the wavelength selective filter can be suppressed.

In the above embodiment, a content of the silica filler with respect to a volume of the adhesive may be 50% by volume or more. According to this embodiment, thermal deformation of the cured adhesive due to a change in environmental temperature is further suppressed. Therefore, the deviation of the position and the direction of the wavelength selective filter in the case where the environmental temperature changes, is less likely to occur, and the increase in the insertion loss due to the wavelength selective filter can be further suppressed.

In an embodiment, a gap between the bottom surface and the placement surface may be 50 μm or more. According to this embodiment, the wavelength selective filter is less likely to be affected by thermal deformation of the base plate due to a change in environmental temperature. Therefore, even when the environmental temperature changes, the deviation of the position and direction of the wavelength selective filter is less likely to occur, and an increase in insertion loss due to the wavelength selective filter can be suppressed.

In an embodiment, a coefficient of linear expansion of the base plate may be $15.0 \times 10^{-6}$ (1/K) or less. According to this embodiment, thermal deformation of the base plate due to a change in environmental temperature is suppressed. Therefore, even when the environmental temperature changes, the deviation of the position and direction of the wavelength selective filter disposed on the base plate is less likely to occur, and an increase in insertion loss due to the wavelength selective filter can be suppressed.

In an embodiment, the wavelength multiplexer/demultiplexer may further include a third collimator optically coupled to the wavelength selective filter in an Mth place among the M-number of wavelength selective filters. According to this embodiment, the number of channels of the wavelength multiplexer/demultiplexer can be increased as necessary by using the third collimator as an upgrade port.

In an embodiment, the wavelength multiplexer/demultiplexer may further include an optical element including a reflection surface extending in a predetermined direction when viewed in a thickness direction of the base plate. The M-number of second collimators and the M-number of wavelength selective filters may be each arranged in the predetermined direction when viewed in the thickness direction of the base plate. The first collimator, the M-number of second collimators, and the M-number of wavelength selective filters may be positioned on a same side with respect to the reflection surface when viewed in the thickness direction of the base plate. The reflection surface may change a direction of the optical path connecting the first collimator and the second collimator in the first place and a direction of the optical path connecting the wavelength selective filter in the mth place (m=1, . . . , M−1) and the second collimator in the (m+1)th place. According to this embodiment, it is possible to downsize the wavelength multiplexer/demultiplexer as compared with a case where second collimators and wavelength selective filters in odd-numbered places are arranged to face second collimators and wavelength selective filters in even-numbered places.

In the embodiment described above, in the thickness direction of the base plate, a position of the wavelength selective filter in an odd-numbered place may differ from a position of the wavelength selective filter in an even-numbered place. The base plate may be disposed between the wavelength selective filter in the odd-numbered place and the wavelength selective filter in the even-numbered place. According to this embodiment, when viewed from the thickness direction of the base plate, the wavelength selective filters in odd-numbered places can be disposed to partially overlap the wavelength selective filters in even-numbered places, and the wavelength multiplexer/demultiplexer can be further downsized.

In an embodiment, the at least one wavelength selective filter may be at least any one of the wavelength selective filters from the first place to an (M/2)th place. According to this embodiment, an increase in insertion loss due to the wavelength selective filter can be effectively suppressed.

In an embodiment, a number of the at least one wavelength selective filter may be (M/2) or more. According to this embodiment, it is possible to more reliably suppress an increase in insertion loss due to the wavelength selective filter.

In an embodiment, the base plate may include a first base plate on which the M-number of wavelength selective filters are placed, and a second base plate on which the first collimator and the M-number of second collimators are placed, the second base plate being a body separated from the first base plate. According to this embodiment, it is possible to independently design the first base plate on which the wavelength selective filters are placed and the second base plate on which the first collimator and the second collimators are placed. Accordingly, it is possible to improve the degree of freedom in arrangement of the wavelength selective filters, the first collimator, and the second collimators.

In an embodiment, the wavelength multiplexer/demultiplexer may further include a housing having an internal space in which the first collimator, the M-number of second collimators, the M-number of wavelength selective filters, and the base plate are housed. The internal space may be sealed. According to this embodiment, for example, the oxidation of the base plate housed in the internal space is suppressed, and the characteristic deterioration of the wavelength multiplexer/demultiplexer can be suppressed.

Details of Embodiments of the Present Disclosure

Specific examples of a wavelength multiplexer/demultiplexer according to the present disclosure will be described below with reference to the drawings. The present disclosure is not limited to these examples, but is defined by the claims and is intended to include all modifications within the meaning and range of equivalency of the claims. In the description of the drawings, the same components are denoted by the same reference numerals, and redundant description will be omitted.

First Embodiment

Figure 2:
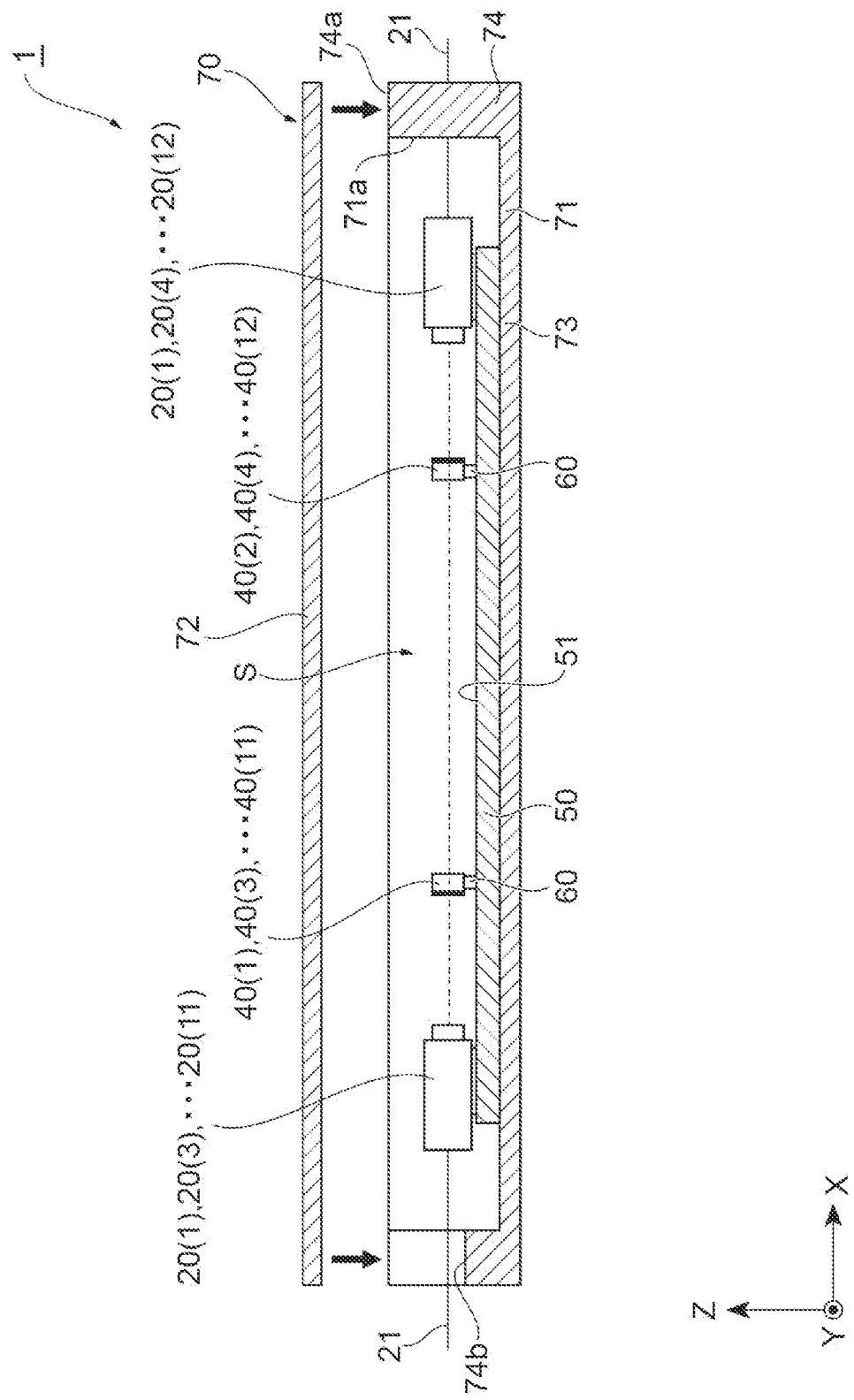
FIG. 2 is a schematic cross-sectional view of the wavelength multiplexer/demultiplexer shown in FIG. 1.
Figure 3:
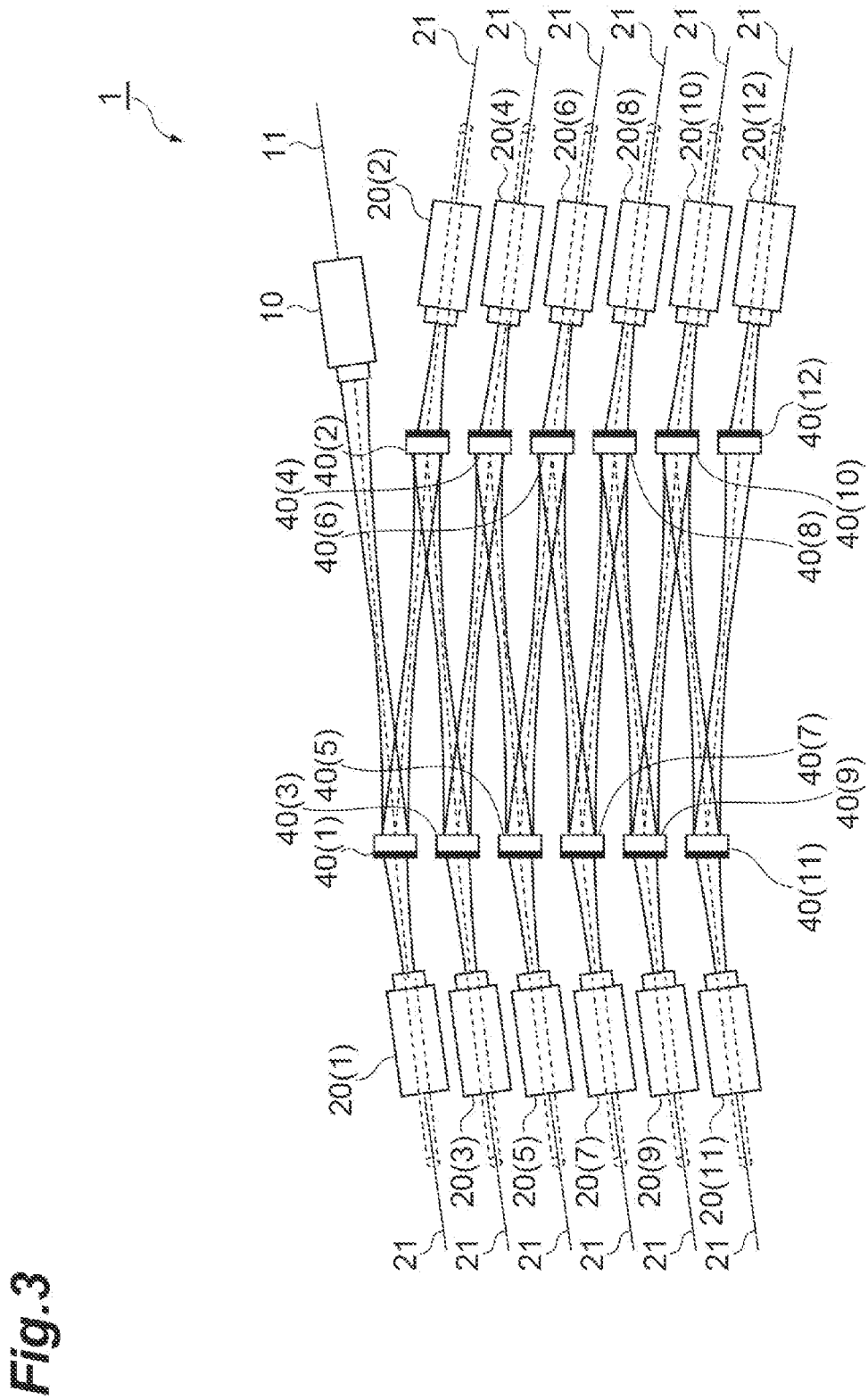
FIG. 3 is a schematic view of the wavelength multiplexer/demultiplexer shown in FIG. 1 with a base plate and a housing omitted from illustration.

FIG. 1 is a schematic plan view of a wavelength multiplexer/demultiplexer 1 according to a first embodiment. FIG. 2 is a schematic cross-sectional view of wavelength multiplexer/demultiplexer 1 shown in FIG. 1. FIG. 3 is a schematic view of wavelength multiplexer/demultiplexer 1 in which a base plate 50 and a housing 70 are not shown. Wavelength multiplexer/demultiplexer 1 is, for example, a MUX/DEMUX module used in an optical communication system. Wavelength multiplexer/demultiplexer 1 has at least one of a function of multiplexing the M-number of optical signals having mutually different wavelengths to generate a wavelength-multiplexed optical signal and a function of demultiplexing a wavelength-multiplexed optical signal including the M-number of optical signals having mutually different wavelengths into individual optical signals. Wavelength multiplexer/demultiplexer 1 includes a first collimator 10, M-number of second collimators 20(1) to 20(M), M-number of wavelength selective filters 40(1) to 40(M), base plate 50, a bonding portion 60, and housing 70. M is any integer equal to or greater than 2, and in the embodiment of the present disclosure M=12.

Figure 4:
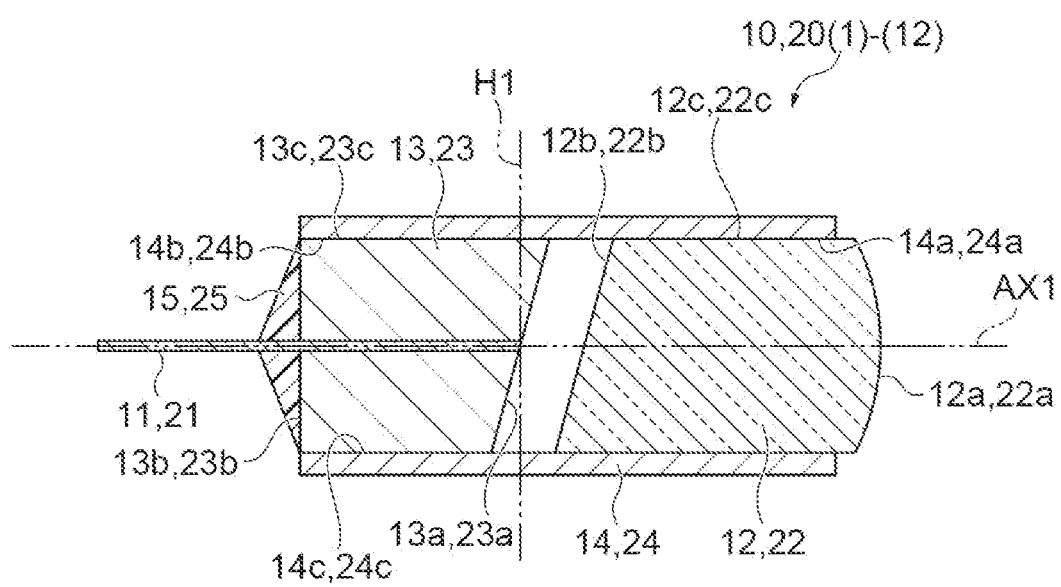
FIG. 4 is a cross-sectional view of a first collimator and a second collimator.

FIG. 4 is a cross-sectional view of first collimator 10 and second collimators 20(1) to 20(M). First collimator 10 includes an optical fiber 11 (first optical waveguide), a first collimating lens 12, a ferrule 13, and a capillary 14.

Optical fiber 11 is, for example, a single-mode optical fiber made of glass. Optical fiber 11 includes a core extending in an optical waveguide direction and a cladding surrounding the periphery of the core. Ferrule 13 is formed in a substantially cylindrical shape. Ferrule 13 includes a first end surface 13a and a second end surface 13b intersecting with a center axis of ferrule 13, and an outer peripheral surface 13c which is a cylindrical surface connecting first end surface 13a and second end surface 13b. Ferrule 13 is attached to the distal end of optical fiber 11. A through hole is formed in ferrule 13 along the center axis of ferrule 13. Optical fiber 11 is inserted into the through hole of ferrule 13. The center axis of ferrule 13 coincides with an optical axis AX1 of optical fiber 11. An end surface of optical fiber 11 is exposed from ferrule 13 at first end surface 13a and is polished together with first end surface 13a so as to be flush with first end surface 13a. The end surface of optical fiber 11 and first end surface 13a are inclined with respect to an imaginary plane H1 perpendicular to optical axis AX1 of optical fiber 11. An inclination angle of first end surface 13a with respect to imaginary plane H1 may be, for example, 6 degrees to 10 degrees, or may be 8 degrees. A bonding portion 15 for fixing optical fiber 11 to ferrule 13 is disposed on second end surface 13b. Bonding portion 15 is a cured material of an adhesive made of resin. Ferrule 13 is formed of glass such as quartz or ceramic such as zirconia.

First collimating lens 12 is a lens component formed in a substantially cylindrical shape, and is optically coupled to optical fiber 11. First collimating lens 12 is formed of glass such as quartz, for example. First collimating lens 12 includes a first end surface 12a and a second end surface 12b that intersect a center axis of first collimating lens 12, and an outer peripheral surface 12c that is a cylindrical surface connecting first end surface 12a and second end surface 12b. First end surface 12a is a spherically curved surface and functions as a convex lens. Second end surface 12b faces the end surface of optical fiber 11, and is optically coupled to the end surface of optical fiber 11. Second end surface 12b is inclined with respect to imaginary plane H1. An inclination angle of second end surface 12b with respect to imaginary plane H1 may be, for example, 6 degrees to 10 degrees, or may be 8 degrees. In the embodiment of the present disclosure, second end surface 12b is parallel to first end surface 13a of ferrule 13.

Capillary 14 is a substantially cylindrical member that houses first collimating lens 12 and ferrule 13. Capillary 14 is formed of glass such as quartz or metal such as SUS (Stainless Used Steel). First collimating lens 12 is inserted from a first opening 14a of capillary 14. Ferrule 13 is inserted from a second opening 14b of capillary 14. Outer peripheral surface 12c of first collimating lens 12 and outer peripheral surface 13c of ferrule 13 are in contact with an inner peripheral surface 14c of capillary 14. The end surface of optical fiber 11 and second end surface 12b of first collimating lens 12 face each other in the internal space of capillary 14. Capillary 14 holds first collimating lens 12 and ferrule 13 so that optical axis AX1 of optical fiber 11 and the center axis of first collimating lens 12 coincide with each other.

Each of Second collimators 20(1) to 20(M) has the same configuration as that of first collimator 10 described above. Each of second collimators 20(1) to 20(M) includes an optical fiber 21 (second optical waveguide), a second collimating lens 22, a ferrule 23, and a capillary 24.

Optical fiber 21 has a configuration similar to that of optical fiber 11 described above. Ferrule 23 is formed in a substantially cylindrical shape. Ferrule 23 includes a first end surface 23a and a second end surface 23b which are flat and intersect a center axis of ferrule 23, and an outer peripheral surface 23c which is a cylindrical surface connecting first end surface 23a and second end surface 23b. Ferrule 23 is attached to a distal end of optical fiber 21. A through hole is formed in ferrule 23 along the center axis of ferrule 23. Optical fiber 21 is inserted into the through hole of ferrule 23. The center axis of ferrule 23 coincides with optical axis AX1 of optical fiber 21. An end surface of optical fiber 21 is exposed from ferrule 23 at first end surface 23a and is polished together with first end surface 23a so as to be flush with first end surface 23a. The end surface of optical fiber 21 and first end surface 23a are inclined with respect to imaginary plane H1 perpendicular to optical axis AX1 of optical fiber 21. An inclination angle of first end surface 23a with respect to imaginary plane H1 may be, for example, 6 degrees or more and 10 degrees or less, or may be 8 degrees. A bonding portion 25 for fixing optical fiber 21 to ferrule 23 is disposed on second end surface 23b. Bonding portion 25 is a cured adhesive made of resin. Ferrule 23 is made of glass such as quartz or ceramic such as zirconia.

Second collimating lens 22 is a lens component formed in a substantially cylindrical shape, and is optically coupled to optical fiber 21. Second collimating lens 22 is made of glass such as quartz, for example. Second collimating lens 22 includes a first end surface 22a and a second end surface 22b that intersect a center axis of second collimating lens 22, and an outer peripheral surface 22c that is a cylindrical surface connecting first end surface 22a and second end surface 22b. First end surface 22a is a spherically curved surface and functions as a convex lens. Second end surface 22b faces the end surface of optical fiber 21 and is optically coupled to the end surface of optical fiber 21. Second end surface 22b is inclined with respect to imaginary plane H1. An inclination angle of second end surface 22b with respect to imaginary plane H1 may be, for example, 6 degrees to 10 degrees, or may be 8 degrees. In the embodiment of the present disclosure, second end surface 22b is parallel to first end surface 23a of ferrule 23.

Capillary 24 is a substantially cylindrical member that houses second collimating lens 22 and ferrule 23. Capillary 24 is formed of glass such as quartz or metal such as SUS, for example. Second collimating lens 22 is inserted from a first opening 24a of capillary 24. Ferrule 23 is inserted from a second opening 24b of capillary 24. Outer peripheral surface 22c of second collimating lens 22 and outer peripheral surface 23c of ferrule 23 are in contact with an inner peripheral surface 24c of capillary 24. The end surface of optical fiber 21 and second end surface 22b of second collimating lens 22 face each other in the internal space of capillary 24. Capillary 24 holds second collimating lens 22 and ferrule 23 so that optical axis AX1 of optical fiber 21 and the center axis of second collimating lens 22 coincide with each other.

Figure 5:
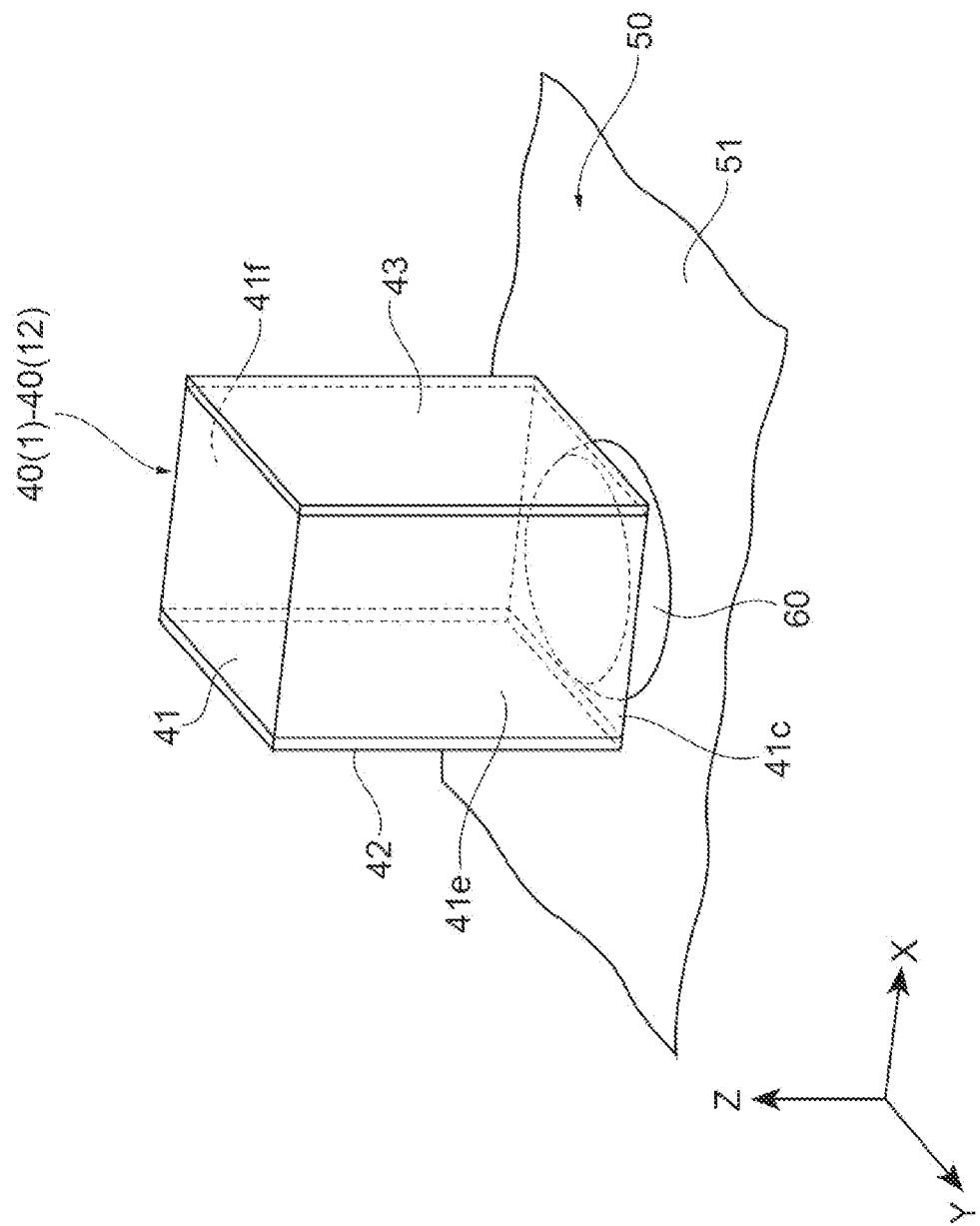
FIG. 5 is a perspective view illustrating a wavelength selective filter according to the first embodiment.
Figure 6:
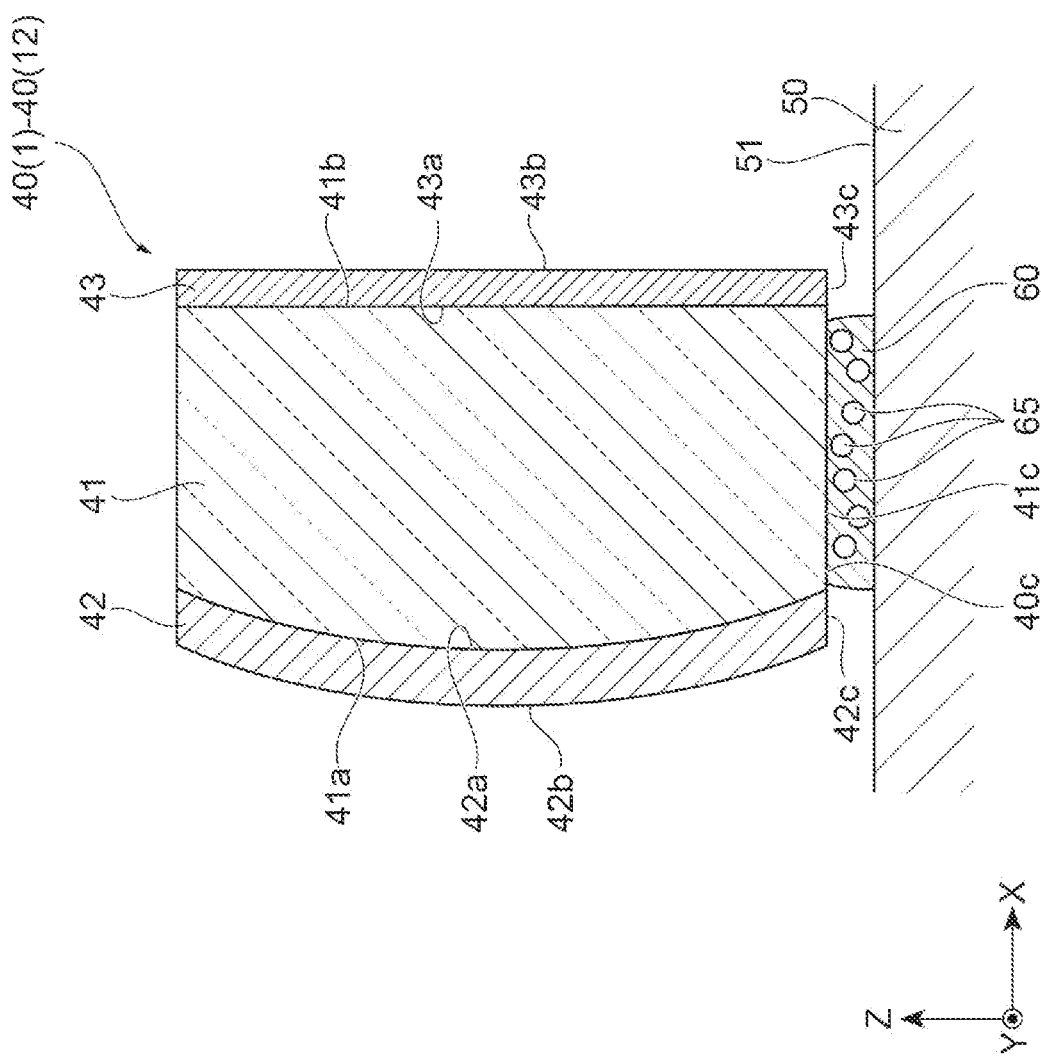
FIG. 6 is a cross-sectional view of the wavelength selective filter according to the first embodiment.

FIG. 5 is a perspective view illustrating wavelength selective filters 40(1) to 40(M). FIG. 6 is a cross-sectional view of wavelength selective filters 40(1) to 40(M). Wavelength selective filters 40(1) to 40(M) transmit optical signals of transmission wavelength bands different from each other and reflect optical signals of wavelength bands other than the respective transmission wavelength bands. Wavelength selective filters 40(1) to 40(M) are fixed to a placement surface 51 of base plate 50 described later by bonding portion 60. Each of wavelength selective filters 40(1) to 40(M) includes a substrate 41, a multilayer film 42, and an antireflection film 43.

Substrate 41 is formed of a material having optical transparency. The material having optical transparency is, for example, glass. "Having optical transparency" refers to transmitting 95% or more of light having a target wavelength. Substrate 41 has optical transparency in a wavelength band including all wavelengths included in a wavelength multiplexed optical signal, for example. Substrate 41 is formed in a substantially rectangular parallelepiped shape. Substrate 41 includes a first main surface 41a, a second main surface 41b, a bottom surface 41c, a first side surface 41e, and a second side surface 41E. First main surface 41a and second main surface 41b are opposite to each other in an X direction (first direction). In the following description, a direction perpendicular to the X direction is referred to as a Y direction, and a direction perpendicular to the X direction and the Y direction is referred to as a Z direction. First main surface 41a and second main surface 41b have a rectangular shape when viewed from the X direction. As shown in FIG. 6, first main surface 41a is a curved surface convex toward the outside of substrate 41. Second main surface 41b is a flat surface along the Y direction and the Z direction.

Bottom surface 41c connects first main surface 41a and second main surface 41b, and faces placement surface 51 of base plate 50 described later in the Z direction. Bottom surface 41c is formed to be flat along the X direction and the Y direction. First side surface 41e and second side surface 41f are opposite to each other in the Y direction (second direction). Each of first side surface 41e and second side surface 41f connects first main surface 41a and second main surface 41b, and extends flatly along the X direction and the Z direction. When viewed from the X direction, a width of substrate 41 along the Y direction may be, for example, 0.8 mm to 2 mm, and a width of substrate 41 along the Z direction may be, for example, 0.8 mm to 2 mm. The maximum thickness of substrate 41 along the X direction may be, for example, 0.5 mm to 2 mm.

Multilayer film 42 is a band-pass filter configured to transmit only an optical signal of a specific transmission wavelength band and reflect optical signals of other wavelength bands. Multilayer film 42 is formed by depositing a large number of thin film filters (TFFs). The thin film filter is formed of dielectric materials. The number of layers of the thin film filter constituting multilayer film 42 is, for example, 100 or more. A thickness of multilayer film 42 is, for example, 30 μm to 100 μm. Multilayer film 42 is directly formed on first main surface 41a of substrate 41 and is in contact with first main surface 41a. Multilayer film 42 extends along first main surface 41a, and includes a curved surface convex in a direction away from first main surface 41a as shown in FIG. 6. In the embodiment of the present disclosure, multilayer film 42 is formed on the entire first main surface 41a.

Multilayer film 42 includes a first surface 42a, a second surface 42b, and a third surface 42c. First surface 42a is closer to first main surface 41a than second surface 42b. First surface 42a is in contact with first main surface 41a. Second surface 42b is a surface opposite to first main surface 41a. Third surface 42c is a surface facing placement surface 51 of base plate 50, and connects first surface 42a and second surface 42b. In the embodiment of the present disclosure, third surface 42c is flush with bottom surface 41c of substrate 41.

Figure 7:
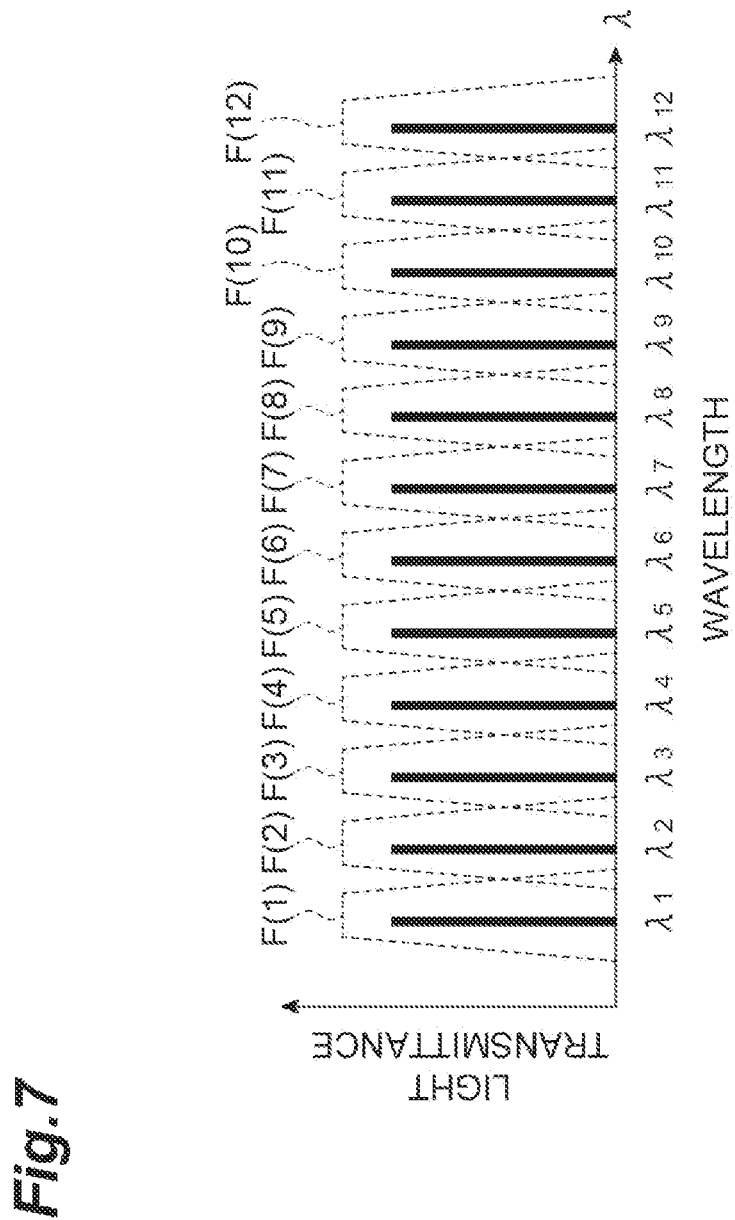
FIG. 7 is a graph illustrating respective transmission wavelength bands of multilayer films included in respective wavelength selective filters.

FIG. 7 is a graph illustrating the transmission wavelength bands of multilayer films 42 included in wavelength selective filters 40(1) to 40(M). In FIG. 7, the horizontal axis represents wavelength, and the vertical axis represents light transmittance. FIG. 7 illustrates transmission wavelength bands F(1) to F(M) respectively corresponding to wavelength selective filters 40(1) to 40(M) and signal wavelengths $\lambda_1$ to $\lambda_M$ of the optical signals. As shown in FIG. 7, multilayer films 42 have different transmission wavelength bands F (1) to F (M) for wavelength selective filters 40(1) to 40(M), respectively. "Different transmission wavelength bands" means that the center wavelengths of the transmission wavelength bands are different from each other, and includes a case where the transmission wavelength bands overlap with each other near the short wavelength end and near the long wavelength end in the transmission wavelength bands. In the embodiment of the present disclosure, the widths of transmission wavelength bands F(1) to F(M) are equal to each other. Transmission wavelength bands F(1) to F(M) include signal wavelengths $\lambda_1$ to $\lambda_M$, respectively.

As an example, the center wavelengths of transmission wavelength bands F(1) to F(M) are signal wavelengths $\lambda_1$ to $\lambda_M$, respectively.

Antireflection film 43 is configured to prevent reflection of the optical signals on second main surface 41b. Antireflection film 43 is an Anti-Reflection (AR) film formed by depositing a plurality of thin film filters. The thin film filter is formed of a dielectric material. The number of layers in the thin film filter constituting antireflection film 43 is, for example, 10 or less. A thickness of antireflection film 43 is, for example, 0.1 μm to 3 μm. Antireflection film 43 is directly formed on second main surface 41b of substrate 41, and is in contact with second main surface 41b. Antireflection film 43 extends along second main surface 41b. In the embodiment of the present disclosure, antireflection film 43 extends flatly along the Y direction and the Z direction. In the embodiment of the present disclosure, antireflection film 43 is formed on the entire second main surface 41b.

Antireflection film 43 includes a first surface 43a, a second surface 43b, and a third surface 43c. First surface 43a is closer to second main surface 41b than second surface 43b. First surface 43a is in contact with second main surface 41b. Second surface 43b is a surface opposite to second main surface 41b. Third surface 43c is a surface facing placement surface 51 of base plate 50 and connects first surface 43a and second surface 43b. In the embodiment of the present disclosure, third surface 43c is flush with bottom surface 41c of substrate 41.

In wavelength selective filters 40(1) to 40(M), substrate 41 is formed of a material having a relatively large coefficient of liner expansion so that the expansion of multilayer film 42 itself and the contraction of multilayer film 42 due to the influence of the expansion of substrate 41 are offset in order to suppress the variation of the transmission wavelength band due to the temperature change to be small. Therefore, substrate 41 typically has a higher coefficient of linear expansion than multilayer film 42. Wavelength selective filters 40(1) to 40(M) are formed through a process of forming multilayer film 42 on first main surface 41a of substrate 41 at a predetermined film deposition temperature and then cooling substrate 41 and multilayer film 42. At this time, due to a difference in coefficient of linear expansion between substrate 41 and multilayer film 42, a convexly curved warp is generated in first main surface 41a of substrate 41 and multilayer film 42. In particular, since multilayer film 42 suitable for a Dense-WDM (DWDM) signal having a narrow wavelength interval is formed by depositing 100 or more layers in the thin film filter in order to obtain a steep transmission characteristic. Multilayer film 42 is formed to be thicker than antireflection film 43, and thus warpage due to a difference in coefficient of liner expansion is likely to occur. The radii of curvature of first surface 42a and second surface 42b of multilayer film 42 are small values, such as, about 1 m. Due to the warpage of multilayer film 42, wavelength selective filters 40(1) to 40(M) act as reflective concave lenses with respect to optical signals incident on antireflection film 43.

As illustrated in FIG. 1, base plate 50 is a plate-shaped member on which first collimator 10, second collimators 20(1) to 20(M), and wavelength selective filters 40(1) to 40(M) are placed, and is fixed to housing 70 described below. A thickness direction of base plate 50 coincides with the Z direction. In the embodiment of the present disclosure, base plate 50 has a rectangular shape with rounded corners when viewed in the Z direction. The shape of base plate 50 is not limited, and may be, for example, a square shape or an elliptical shape. Base plate 50 includes flat placement surface 51 extending along the X direction and the Y direction. First collimator 10, second collimators 20(1) to 20(M), and wavelength selective filters 40(1) to 40(M) are placed on placement surface 51. Base plate 50 may be formed of a material having a relatively low coefficient of linear expansion, such as stainless steels such as SUS430 or SUS410, glass, or invar. The coefficient of linear expansion of base plate 50 may be, for example, $15.0 \times 10^{-6}$ (1/K) or less.

Bonding portion 60 is a cured material of an adhesive (cured adhesive), and is a portion for fixing each of wavelength selective filters 40(1) to 40(M) to placement surface 51 of base plate 50. As used herein, the term "adhesive" refers to the composition of bonding portion 60 in a pre-cured (uncured) state. Bonding portion 60 is formed by curing the adhesive. Bonding portions 60 suppresses movement and variation in direction of each of wavelength selective filters 40(1) to 40(M) with respect to placement surface 51. Bonding portion 60 is disposed between bottom surface 41c of substrate 41 and placement surface 51 of base plate 50, as shown in FIG. 6. Bonding portion 60 contacts bottom surface 41c of substrate 41 and does not contact multilayer film 42 and antireflection film 43. Bonding portion 60 is in direct contact with bottom surface 41c. Hereinafter, a surface obtained by combining bottom surface 41c of substrate 41, third surface 42c of multilayer film 42, and third surface 43c of antireflection film 43 is referred to as a bottom surface 40c of each of wavelength selective filters 40(1) to 40(M). When viewed from the Z direction, the contact area of bottom surface 40c with bonding portion 60 may be 70% or less of the entire area of bottom surface 40c, or may be 50% or less.

In the embodiment of the present disclosure, in all wavelength selective filters 40(1) to 40(M), bonding portion 60 is in contact with bottom surface 41c of substrate 41 and is in non-contact with multilayer film 42. Therefore, in at least one of wavelength selective filter 40(1) in the first place to wavelength selective filter 40(M/2) in the (M/2)th place, bonding portion 60 is in contact with bottom surface 41c of substrate 41 and is in non-contact with multilayer film 42. Further, in (M/2)-number or more wavelength selective filters 40(1) to 40(M) among M-number of wavelength selective filters 40(1) to 40(M), each bonding portion 60 is in contact with each bottom surface 41c of substrate 41 and is in non-contact with each multilayer film 42. In at least one wavelength selective filter 40(1) to 40(M) among all wavelength selective filters 40(1) to 40(M), bonding portion 60 is in contact with bottom surface 41c of substrate 41 and is in non-contact with multilayer film 42.

The adhesive constituting bonding portion 60 includes, for example, an adhesive resin. The adhesive resin included in the adhesive may be an ultraviolet curable resin that is cured by being irradiated with ultraviolet rays. When the adhesive includes an ultraviolet curable resin, bonding portion 60 is formed by irradiating the adhesive with ultraviolet rays in a state in which the adhesive is disposed between bottom surface 41c and placement surface 51, for example. The adhesive includes a filler 65 for preventing thermal deformation of bonding portion 60 due to a change in environmental temperature. Filler 65 is also included in bonding portion 60, which is the cured adhesive. Filler 65 has a smaller coefficient of liner expansion than the adhesive resin. The material of filler 65 is, for example, silica. The shape of filler 65 may be, for example, spherical or polygonal. The average particle diameter of filler 65 may be, for example, 10 μm or more. The average particle diameter of filler 65 is an average value of projected area equivalent diameters measured by a microscopic method or an average value of spherical volume equivalent diameters measured by a laser diffraction scattering method. The content of filler 65 with respect to the volume of the adhesive may be, for example, 50% by volume or more, or 70% by volume or more. The content of filler 65 with respect to the volume of bonding portion 60 after curing may be substantially equal to the content of filler 65 with respect to the volume of the adhesive before curing. For example, when the content of filler 65 with respect to the volume of the adhesive is 50% by volume or more, the content of filler 65 with respect to the volume of bonding portion 60 may also be 50% by volume or more.

A thickness of bonding portion 60 is larger than the average particle diameter of filler 65 and may be, for example, 30 μm or more or 50 μm or more. The thickness of bonding portion 60 is the maximum thickness in the Z direction of bonding portion 60 located between bottom surface 41c and placement surface 51. Therefore, when the thickness of bonding portion 60 is 30 μm or more, the gap between bottom surface 41c and placement surface 51 in the Z direction is at least 30 μm or more. From the viewpoint of suppressing thermal deformation of wavelength selective filters 40(1) to 40(M) due to heat from base plate 50, the gap between bottom surface 41c and placement surface 51 in the Z direction is preferably large, and may be, for example, 30 μm or more or 50 μm or more.

As shown in FIGS. 1 and 2, housing 70 is formed in a box shape having an internal space S. Internal space S is, for example, sealed. Further, internal space S is filled with an inert gas such as nitrogen. Housing 70 houses first collimator 10, second collimators 20(1) to 20(M), wavelength selective filters 40(1) to 40(M), and base plate 50 in internal space S. Housing 70 includes a main body 71 including an opening 71a, and a cover 72 closing opening 71a. Main body 71 includes a bottom plate 73 extending along the X direction and the Y direction, and a side wall 74 extending along the Z direction from an outer edge of bottom plate 73. A plurality of recessed portions 74b recessed toward bottom plate 73 are formed on an end surface 74a of side wall 74 in the Z direction. Optical fiber 11 and optical fibers 21 are inserted into the plurality of recessed portions 74b.

Cover 72 is formed in a plate shape. Cover 72 is attached to main body 71 so as to close opening 71a in a state where optical fiber 11 and optical fibers 21 are inserted into recessed portions 74b. Each gap between each surface of recessed portion 74b and the surface of cover 72 may be sealed with a sealing material such as a resin. The sealing material prevents outside air, moisture, and dust from entering internal space S. The sealing material prevents an inert gas from flowing out from internal space S when internal space S is filled with the inert gas.

Next, an arrangement of first collimator 10, second collimators 20(1) to 20(M), and wavelength selective filters 40(1) to 40(M) will be described. As shown in FIG. 1, second collimators 20(1) to 20(M) are arranged in two rows of a first row L11 and a second row L12 when viewed from the Z direction. Specifically, second collimators 20(1), 20(3), . . . , and 20(M−1) in odd-numbered places are arranged in a line in this order to form first row L11. Second collimators 20(2), 20(4), . . . , and 20(M) in even-numbered places are arranged in a line in this order to form second row L12. The arrangement direction of first row L11 and second row L12 in the embodiment of the present disclosure is the Y direction. The arrangement direction of first row L11 and the arrangement direction of second row L12 are parallel to each other.

Similarly to second collimators 20(1) to 20(M), wavelength selective filters 40(1) to 40(M) are arranged in two rows of a first row L21 and a second row L22 when viewed from the Z direction. Specifically, wavelength selective filters 40(1), 40(3), . . . , and 40(M−1) in odd-numbered places are arranged in a line in this order to form first row L21. Wavelength selective filters 40(2), 40(4), . . . , and 40(M) in even-numbered places are arranged in a line in this order to form second row L22. The arrangement direction of first row L21 and second row L22 in the embodiment of the present disclosure is the Y direction. The arrangement direction of first row L21 and the arrangement direction of second row L22 are parallel to each other. Wavelength selective filters 40(1) to 40(M) are arranged such that the positions thereof in the arrangement direction are alternately arranged in first row L21 and second row L22.

Antireflection films 43 of wavelength selective filters 40(1), 40(3), . . . , and 40(M−1) of first row L21 face second row L22. Antireflection films 43 of wavelength selective filters 40(2), 40(4), . . . , 40(M) in the second row L22 face first row L21. The position of wavelength selective filter 40(2) in the Y direction is between the position of wavelength selective filter 40(1) in the Y direction and the position of wavelength selective filter 40(3) in the Y direction. The same applies to subsequent wavelength selective filters 40(3) to 40(M−1). That is, in the Y direction, wavelength selective filter 40($m$) in an mth (m=2, . . . , M−1) place is located between wavelength selective filter 40($m$−1) and wavelength selective filter 40($m$+1). When viewed from the Z direction, first row L21 and second row L22 of wavelength selective filters 40(1) to 40(M) are disposed between first row L11 and second row L12 of second collimators 20(1) to 20(M).

First collimator 10 is disposed on a straight line connecting wavelength selective filter 40(1) and second collimator 20(1) when viewed from the Z direction. First collimator 10 is linearly and spatially optically coupled to second collimator 20(1) in the first place through wavelength selective filter 40(1) in the first place. That is, the optical path connecting first collimator 10 and second collimator 20(1) passes through wavelength selective filter 40(1). Wavelength selective filter 40(1) is optically coupled to first collimator 10 on second main surface 41$b$ of substrate 41, and is optically coupled to second collimator 20(1) on first main surface 41$a$ of substrate 41.

Second main surface 41$b$ of substrate 41 of wavelength selective filter 40(1) is linearly and spatially optically coupled to collimator 20(2) in the second place through wavelength selective filter 40(2) in the second place. That is, the optical path connecting second main surface 41$b$ of substrate 41 of wavelength selective filter 40(1) and second collimator 20(2) passes through wavelength selective filter 40(2). Wavelength selective filter 40(2) is optically coupled to wavelength selective filter 40(1) on second main surface 41$b$ of substrate 41, and is optically coupled to second collimator 20(2) on first main surface 41$a$ of substrate 41. Second collimators 20(3) to 20(M) subsequent from the third place and wavelength selective filters 40(3) to 40(M) subsequent from the third place are also optically coupled in the same manner.

In other words, the above configuration is as follows. Second main surface 41$b$ of substrate 41 of wavelength selective filter 40($m$) in the mth (m=1, . . . , M−1) place is optically coupled linearly and spatially to second collimator 20($m$+1) in the (m+1)th place through wavelength selective filter 40($m$+1) in the (m+1)th place. That is, the optical path connecting second main surface 41$b$ of substrate 41 of wavelength selective filter 40($m$) and second collimator 20($m$+1) passes through wavelength selective filter 40($m$+1). Wavelength selective filter 40($m$+1) is optically coupled to wavelength selective filter 40($m$) on second main surface 41$b$ of substrate 41, and is optically coupled to second collimator 20($m$+1) on first main surface 41$a$ of substrate 41.

Figure 8:
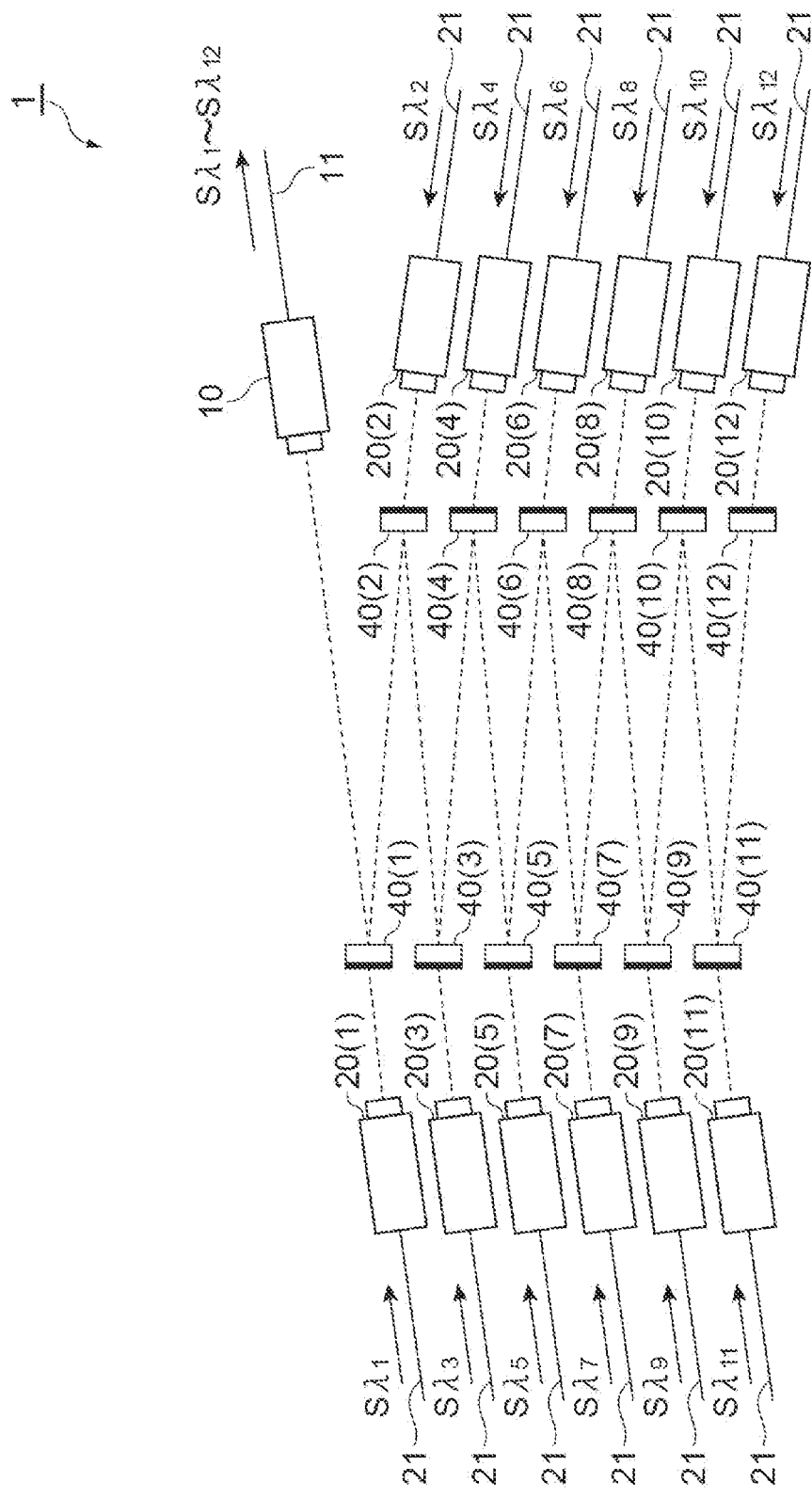
FIG. 8 is a diagram illustrating an operation of the wavelength multiplexer/demultiplexer in a case of multiplexing M-number of optical signals with different wavelengths.

An operation of wavelength multiplexer/demultiplexer 1 when a plurality of optical signals are multiplexed will be described with reference to FIG. 8. FIG. 8 is a diagram illustrating the operation of wavelength multiplexer/demultiplexer 1 in a case where the M-number of optical signals $S\lambda_1$ to $S\lambda_M$ having mutually different wavelengths are multiplexed. In this case, first, Mth optical signal $S\lambda_M$ is output from second collimator 20(M) in the Mth place and reaches wavelength selective filter 40(M) in the Mth place. The optical signal $S\lambda_M$ is transmitted through wavelength selective filter 40(M), reaches wavelength selective filter 40(M−1) in the (M−1)th place, and is reflected by multilayer film 42 of wavelength selective filter 40(M−1).

At the same time, the (M−1)th optical signal $S\lambda_{M-1}$ is output from second collimator 20(M−1) in the (M−1)th place and reaches wavelength selective filter 40(M−1). The optical signal $S\lambda_{M-1}$ is transmitted through wavelength selective filter 40(M−1) and is multiplexed with the optical signal $S\lambda_M$. The combined light reaches wavelength selective filter 40(M−2) in the (M−2)th place, and is reflected by multilayer film 42 of wavelength selective filter 40(M−2).

At the same time, the (M−2)th optical signal $S\lambda_{M-2}$ is output from second collimator 20(M−2) in the (M−$_2$)th place and reaches wavelength selective filter 40(M−2). The optical signal $S\lambda_{M-2}$ is transmitted through wavelength selective filter 40(M−2) and is multiplexed with the optical signals $S\lambda_M$ and $S\lambda_{M-1}$. Thereafter, similarly, the optical signals up to the first optical signal $S\lambda_1$ are sequentially multiplexed to generate a wavelength-multiplexed optical signal. The generated wavelength-multiplexed optical signal reaches first collimator 10 from wavelength selective filter 40(1), and is output to the outside of wavelength multiplexer/demultiplexer 1 through optical fiber 11.

Figure 9:
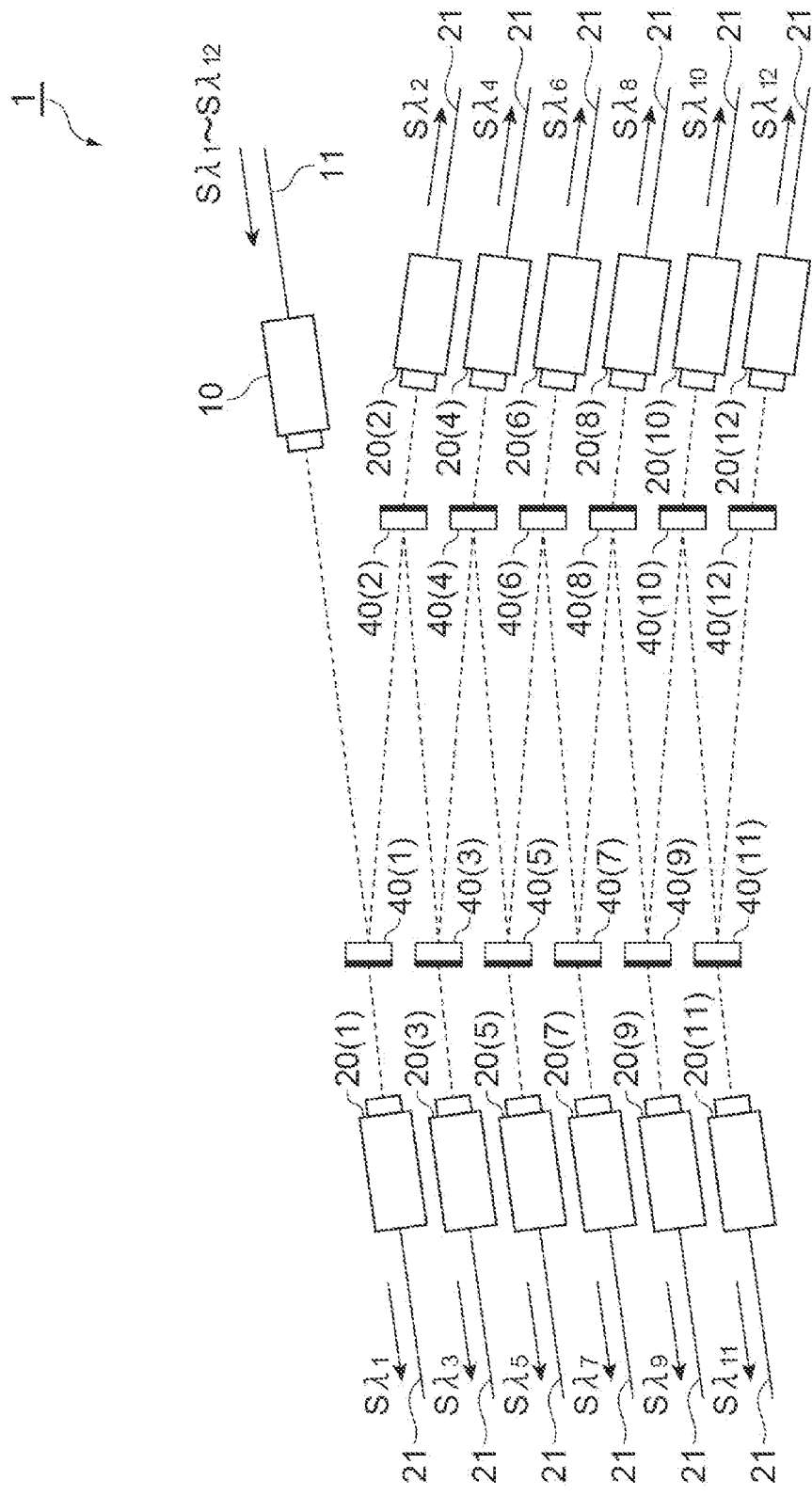
FIG. 9 is a diagram illustrating an operation of the wavelength multiplexer/demultiplexer in a case of demultiplexing M-number of optical signals with different wavelengths.

With reference to FIG. 9, an operation of wavelength multiplexer/demultiplexer 1 when a plurality of optical signals are demultiplexed will be described. FIG. 9 is a diagram illustrating the operation of wavelength multiplexer/demultiplexer 1 in a case where the M-number of optical signals $S\lambda_1$ to $S\lambda_M$ having mutually different wavelengths are demultiplexed. In this case, first, a wavelength-multiplexed optical signal including optical signals $S\lambda_1$ to $S\lambda_M$ is output from first collimator 10 and reaches wavelength selective filter 40(1). The first optical signal $S\lambda_1$ is transmitted through wavelength selective filter 40(1) and is output to the outside of wavelength multiplexer/demultiplexer 1 through optical fiber 21 of second collimator 20(1).

The remaining optical signals $S\lambda_2$ to $S\lambda_M$ are reflected by multilayer film 42 of wavelength selective filter 40(1) and reach wavelength selective filter 40(2). The second optical signal $S\lambda_2$ is transmitted through wavelength selective filter 40(2) and is output to the outside of wavelength multiplexer/demultiplexer 1 through optical fiber 21 of second collimator 20(2). The remaining optical signals $S\lambda_3$ to $S\lambda_M$ are reflected by multilayer film 42 of wavelength selective filter 40(2) and reach wavelength selective filter 40(3) in the third place. Thereafter, the optical signals up to the optical signal $S\lambda_M$ are demultiplexed in order in the same manner, and each of optical signals $S\lambda_1$ to $S\lambda_M$ is output to the outside of wavelength multiplexer/demultiplexer 1.

Figure 28:
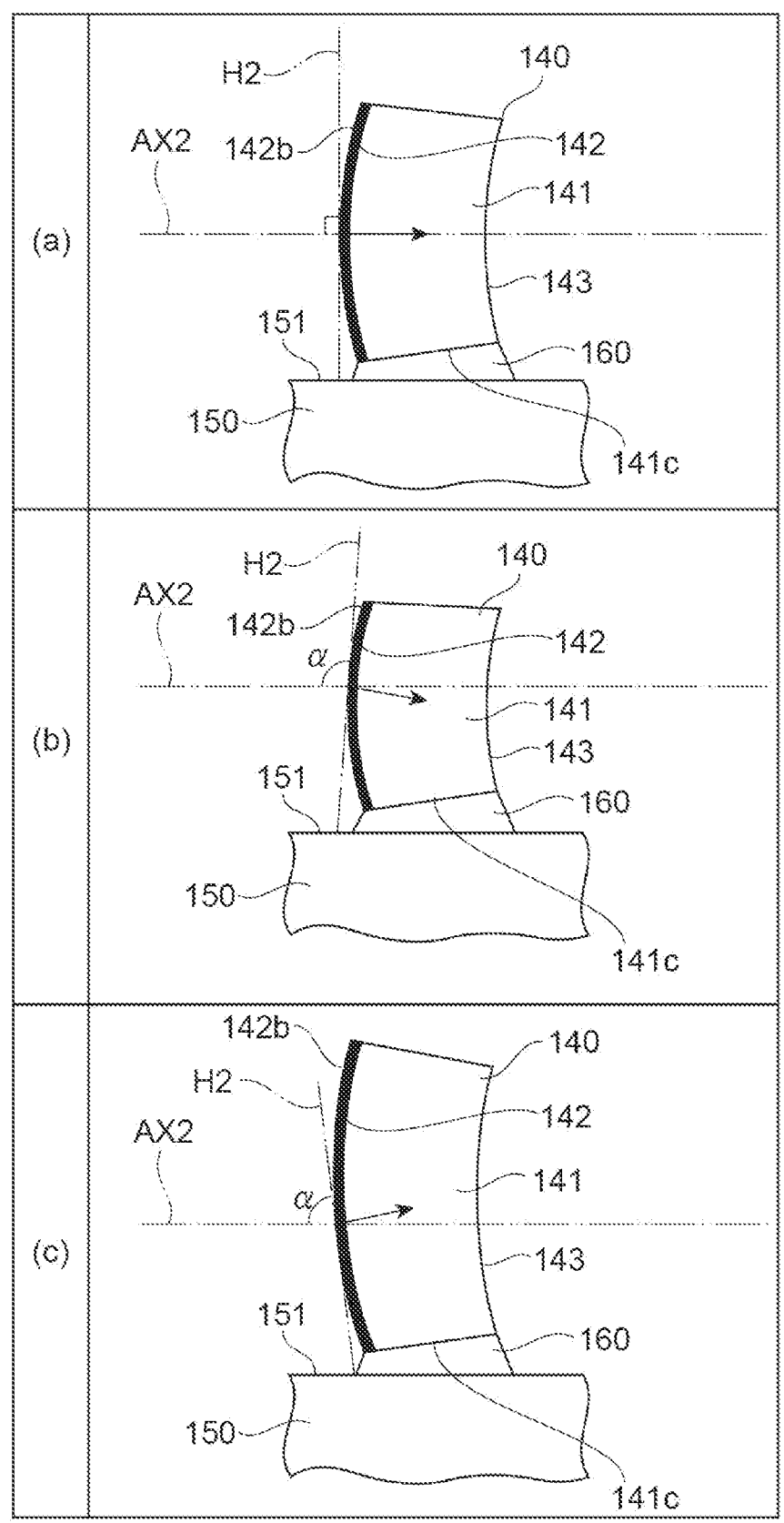
FIG. 28 is a diagram illustrating a wavelength selective filter included in a conventional wavelength multiplexer/demultiplexer.

Effects obtained by wavelength multiplexer/demultiplexer 1 of the above-described embodiment of the present disclosure will be described together with problems of a conventional wavelength multiplexer/demultiplexer. First, a wavelength selective filter 140 included in the conventional wavelength multiplexer/demultiplexer will be described with reference to FIG. 28. FIG. 28 is a diagram illustrating wavelength selective filter 140 included in a conventional wavelength multiplexer/demultiplexer. FIG. 28 shows a state in which the shape of wavelength selective filter 140 is deformed with a change in environmental temperature. Part (a) of FIG. 28 shows wavelength selective filter 140 in an environment at room temperature (for example, 25° C.), part (b) shows wavelength selective filter 140 in an environment at a temperature lower than room temperature (for example, −40° C.), and part (c) shows wavelength selective filter 140 in an environment at a temperature higher than room temperature (for example, 85° C.).

Wavelength selective filter 140 has a configuration similar to that of wavelength selective filters 40(1) to 40(M) described above. Specifically, wavelength selective filter 140 includes a substrate 141, a multilayer film 142, and an antireflection film 143, and is fixed to a placement surface 151 of a base plate 150 by a bonding portion 160. The conventional wavelength multiplexer/demultiplexer is different from wavelength multiplexer/demultiplexer 1 in that bonding portion 160 is in contact with multilayer film 142 and antireflection film 143 of wavelength selective filter 140. Bonding portion 160 is in contact with a bottom surface 141c of substrate 141, multilayer film 142, and antireflection film 143.

As shown in part (a) in FIG. 28, in the room temperature environment, a tangent plane H2 of a second surface 142b at the intersection between second surface 142b of multilayer film 142 and an optical axis AX2 of the optical signal incident on wavelength selective filter 140 is perpendicular to optical axis AX2. In contrast, as shown in part (b) and part (c), tangent plane H2 is inclined with respect to optical axis AX2 in the low-temperature environment and the high-temperature environment. As described above, substrate 141 is formed of a material having a relatively large coefficient of linear expansion. Multilayer film 142 is deformed following thermal deformation of substrate 141 due to a change in environmental temperature. In the low-temperature environment, the multilayer film 142 deforms to increase its curvature, and in the high-temperature environment, multilayer film 142 deforms to decrease its curvature. At this time, since the end portion of wavelength selective filter 140 close to base plate 150 is fixed (bound) to placement surface 151 of base plate 150 by bonding portion 160, tangent plane H2 is inclined such that an angle (angle α in FIG. 28) formed with optical axis AX2 is larger than 90° in the low-temperature environment. In the high-temperature environment, tangent plane H2 is inclined so that an angle α formed with optical axis AX2 is smaller than 90°. That is, multilayer film 142 is inclined away from placement surface 151 in the low-temperature environment, and multilayer film 142 is inclined toward placement surface 151 in the high-temperature environment. The unintended inclination of multilayer film 142 due to the temperature change may cause an optical path deviation of an optical signal reflected from wavelength selective filter 140, thereby increasing insertion loss due to wavelength selective filter 140.

On the other hand, in wavelength multiplexer/demultiplexer 1 according to the embodiment of the present disclosure, in at least one of M-number of wavelength selective filters 40(1) to 40(M), bonding portion 60 is in contact with bottom surface 41c of substrate 41 and is in non-contact with multilayer film 42. Since bonding portion 60 is in non-contact with multilayer film 42, multilayer film 42 is not bound to placement surface 51 of base plate 50 by bonding portion 60. Therefore, stress generated in multilayer film 42 when thermal deformation of substrate 41 occurs due to a change in environmental temperature is reduced. As a result, in wavelength multiplexer/demultiplexer 1, the inclination of multilayer film 42 when the environmental temperature changes is suppressed. Therefore, in wavelength multiplexer/demultiplexer 1, even when the environmental temperature changes, the optical path deviation of the optical signal reflected by wavelength selective filters 40(1) to 40(M) is less likely to occur, and an increase in insertion loss due to wavelength selective filters 40(1) to 40(M) can be suppressed.

In the embodiment of the present disclosure, the adhesive constituting bonding portion 60 (uncured adhesive) includes an ultraviolet curable resin. Thus, the adhesive can be quickly cured by irradiating the adhesive with ultraviolet rays. Therefore, in the process of curing the adhesive, the deviation of positions and directions of wavelength selective filters 40(1) to 40(M) are less likely to occur, and an increase in insertion loss due to wavelength selective filters 40(1) to 40(M) can be suppressed.

In the embodiment of the present disclosure, the adhesive constituting bonding portion 60 (uncured adhesive) may include filler 65 formed of silica. Since silica is a material having a relatively small coefficient of linear expansion, thermal deformation of bonding portion 60 due to a change in environmental temperature is suppressed. Therefore, even when the environmental temperature changes, the deviation of positions and directions of wavelength selective filters 40(1) to 40(M) fixed by bonding portion 60 is less likely to occur, and an increase in insertion loss due to wavelength selective filters 40(1) to 40(M) can be suppressed.

In the embodiment of the present disclosure, the content of filler 65 with respect to the volume of the adhesive constituting bonding portion 60 (uncured adhesive) may be 50% by volume or more. Thus, thermal deformation of bonding portion 60 due to a change in environmental temperature is further suppressed. Therefore, the deviation of positions and directions of wavelength selective filters 40(1) to 40(M) is less likely to occur when the environmental temperature changes, and it is possible to further suppress an increase in insertion loss due to wavelength selective filters 40(1) to 40(M).

In the embodiment of the present disclosure, the gap between bottom surface 41c of substrate 41 and placement surface 51 of base plate 50 may be 50 μm or more. Thus, wavelength selective filters 40(1) to 40(M) are less likely to be affected by thermal deformation of base plate 50 due to a change in environmental temperature. Specifically, the bonding portion 60 reduces the influence of thermal deformation of base plate 50. Therefore, even when the environmental temperature changes, the deviation of positions and directions of wavelength selective filters 40(1) to 40(M) is less likely to occur, and an increase in insertion loss due to wavelength selective filters 40(1) to 40(M) can be suppressed.

In the embodiment of the present disclosure, the coefficient of linear expansion of base plate 50 may be $15.0 \times 10^{-6}$ (1/K) or less. Thus, thermal deformation of base plate 50 due to a change in environmental temperature is suppressed. Therefore, even when the environmental temperature changes, the deviation of positions and directions of wavelength selective filters 40(1) to 40(M) disposed on base plate 50 is less likely to occur, and an increase in insertion loss due to wavelength selective filters 40(1) to 40(M) can be suppressed.

In the embodiment of the present disclosure, in at least one of wavelength selective filters 40(1) to 40(M/2) from the first place to the (M/2)th place, bonding portion 60 is in contact with bottom surface 41c of substrate 41 and is in non-contact with multilayer film 42. For example, as described with reference to FIG. 9, when the wavelength-multiplexed optical signal including the plurality of optical signals $S\lambda_1$ to $S\lambda_M$ is demultiplexed while being sequentially transmitted from wavelength selective filter 40(1) to wavelength selective filter 40(M), the deviation of the position and direction of the wavelength selective filter (for example, wavelength selective filters 40(1) to 40(M/2)) disposed on the upstream in the optical path significantly increases the insertion loss compared to the deviation of the position and direction of the wavelength selective filter (for example, wavelength selective filters 40((M/2)+1) to 40(M)) disposed on the downstream in the optical path. In wavelength multiplexer/demultiplexer 1 according to the embodiment of the present disclosure, bonding portion 60 is in non-contact with multilayer film 42 in at least one of wavelength selective filters 40(1) to 40(M/2) from the first to the (M/2)th place disposed on the upstream in the optical path. Therefore, the deviation of positions and directions of wavelength selective filters 40(1) to 40(M/2) disposed on the upstream in the optical path is less likely to occur, and an increase in insertion loss due to wavelength selective filters 40(1) to 40(M) can be effectively suppressed.

In the embodiment of the present disclosure, the number of wavelength selective filters 40(1) to 40(M) in which bonding portion 60 is in contact with bottom surface 41c of substrate 41 and is in non-contact with multilayer film 42 is (M/2) or more. In this case, it is possible to more reliably suppress an increase in insertion loss due to wavelength selective filters 40(1) to 40(M).

In the embodiment of the present disclosure, wavelength multiplexer/demultiplexer 1 further includes housing 70 in which first collimator 10, M-number of second collimators 20(1) to 20(M), M-number of wavelength selective filters 40(1) to 40(M), and base plate 50 are housed in internal space S. Internal space S is sealed and filled with an inert gas. In this case, for example, oxidation of base plate 50 housed in internal space S is suppressed, and it is possible to suppress characteristic deterioration of wavelength multiplexer/demultiplexer 1.

First Modification of First Embodiment

Figure 10:
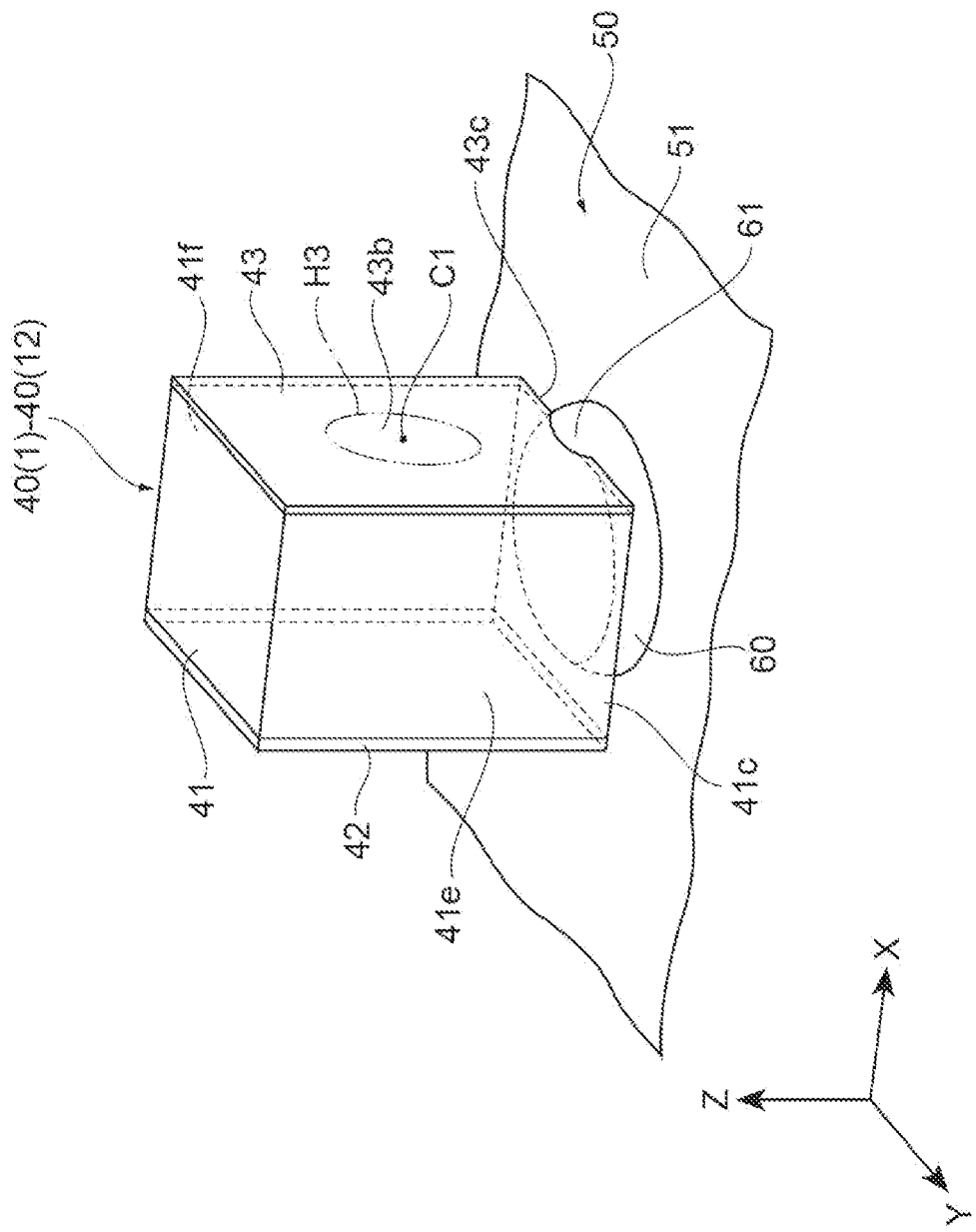
FIG. 10 is a perspective view illustrating a wavelength selective filter according to a first modification of the first embodiment.
Figure 11:
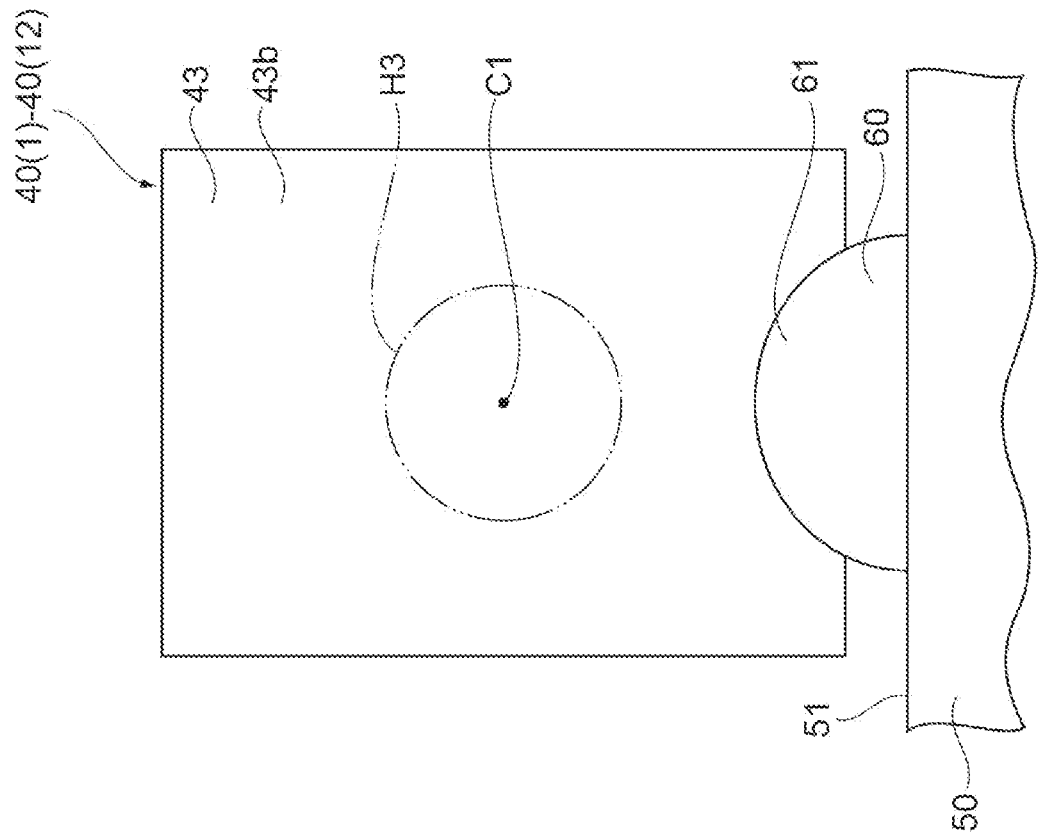
FIG. 11 is a diagram of the wavelength selective filter according to the first modification of the first embodiment as viewed from an antireflection film side.

A first modification of the wavelength multiplexer/demultiplexer according to the first embodiment will be described with reference to FIGS. 10 and 11. FIG. 10 is a perspective view illustrating wavelength selective filters 40(1) to 40(M) according to the first modification. FIG. 11 is a diagram of wavelength selective filters 40(1) to 40(M) according to the first modification as viewed from antireflection film 43 side.

In the present modification, bonding portion 60 is in contact with not only bottom surface 41c of substrate 41 but also second surface 43b and third surface 43c of antireflection film 43. Bonding portion 60 is in direct contact with second surface 43b and third surface 43c. FIG. 11 shows a center C1 of second main surface 41b of substrate 41 when viewed from the X direction, and an imaginary circle H3 having center C1 as the center. The optical signals transmitted through wavelength selective filters 40(1) to 40(M) pass through, for example, center C1. In the embodiment of the present disclosure, the radius of imaginary circle H3 is 300 μm. A contact part 61 of bonding portion 60 in contact with antireflection film 43 is located outside imaginary circle H3 when viewed from the X direction. That is, contact part 61 is located at a distance of 300 μm or more from center C1 of second main surface 41b when viewed from the X direction.

In the present modification, bonding portion 60 is in contact with second surface 43b and third surface 43c of antireflection film 43. Thus, the contact area between each of wavelength selective filters 40(1) to 40(M) and bonding portion 60 increases, and each of wavelength selective filters 40(1) to 40(M) is more firmly fixed to base plate 50 by bonding portion 60. Therefore, even when a physical external force is applied to, for example, wavelength selective filters 40(1) to 40(M), the deviation of positions and directions of wavelength selective filters 40(1) to 40(M) is less likely to occur, and an increase in insertion loss due to wavelength selective filters 40(1) to 40(M) can be suppressed.

In the present modification, contact part 61 of bonding portion 60 in contact with antireflection film 43 is located at a distance of 300 μm or more from center C1 of second main surface 41b when viewed in the X direction. Since contact part 61 of bonding portion 60 is positioned away from center C1 of second main surface 41b to some extent, it is possible to suppress the optical signal transmitted through each of wavelength selective filters 40(1) to 40(M) from being blocked by bonding portion 60.

Second Modification of First Embodiment

Figure 12:
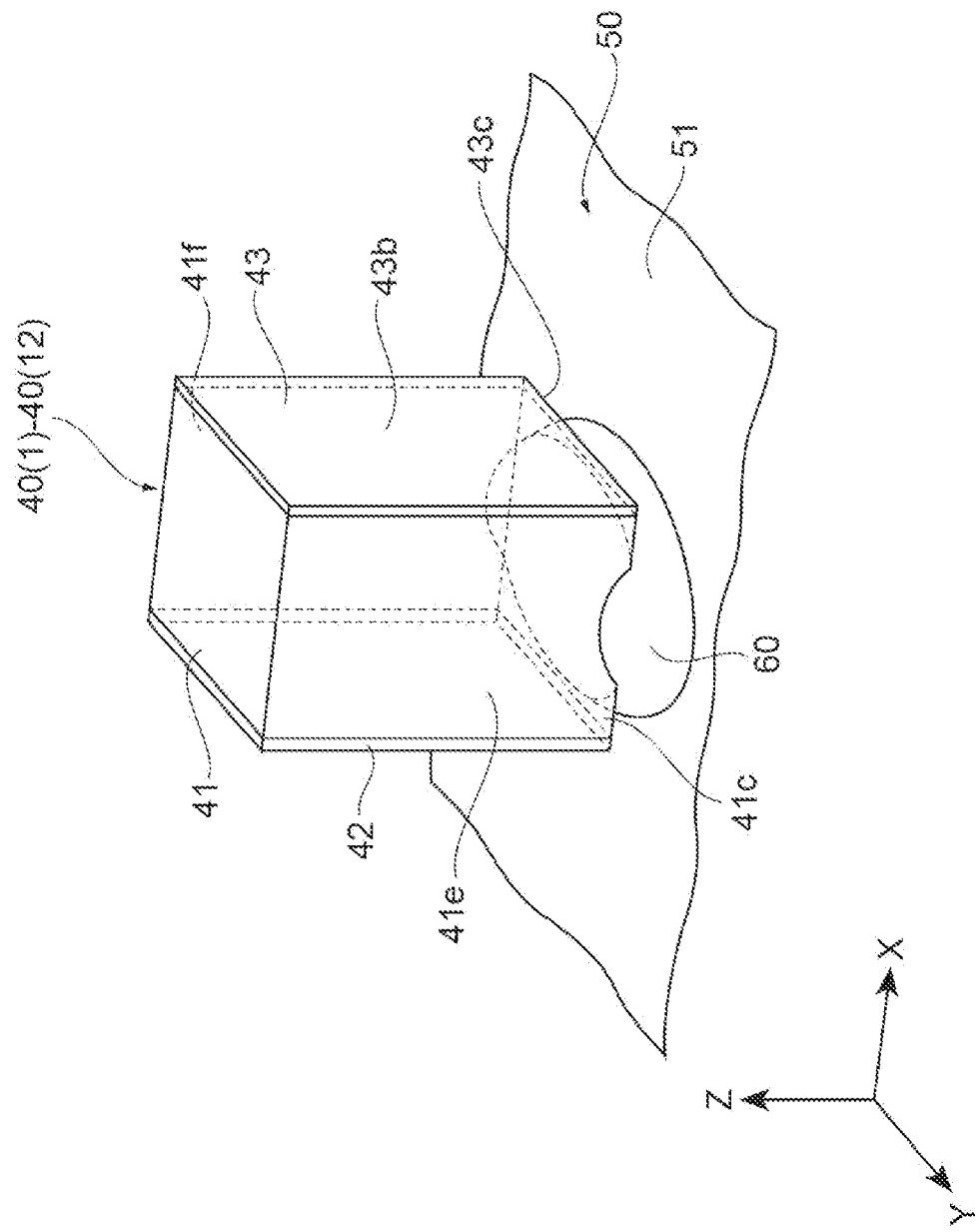
FIG. 12 is a perspective view illustrating a wavelength selective filter according to a second modification of the first embodiment.

A second modification of the wavelength multiplexer/demultiplexer according to the first embodiment will be described with reference to FIG. 12. FIG. 12 is a perspective view illustrating wavelength selective filters 40(1) to 40(M) according to the second modification. In the second modification, bonding portion 60 is in contact with not only bottom surface 41c of substrate 41 but also first side surface 41e and second side surface 41f of substrate 41. Bonding portion 60 is in direct contact with first side surface 41e and second side surface 41f.

In the present modification, bonding portion 60 is in contact with first side surface 41e and second side surface 41f of substrate 41. Thus, the contact area between each of wavelength selective filters 40(1) to 40(M) and bonding portion 60 increases, and each of wavelength selective filters 40(1) to 40(M) is more firmly fixed to base plate 50 by bonding portion 60. Therefore, even when a physical external force is applied to, for example, wavelength selective filters 40(1) to 40(M), the deviation of positions and directions of wavelength selective filters 40(1) to 40(M) is less likely to occur, and an increase in insertion loss due to wavelength selective filters 40(1) to 40(M) can be suppressed.

Third Modification of First Embodiment

Figure 13:
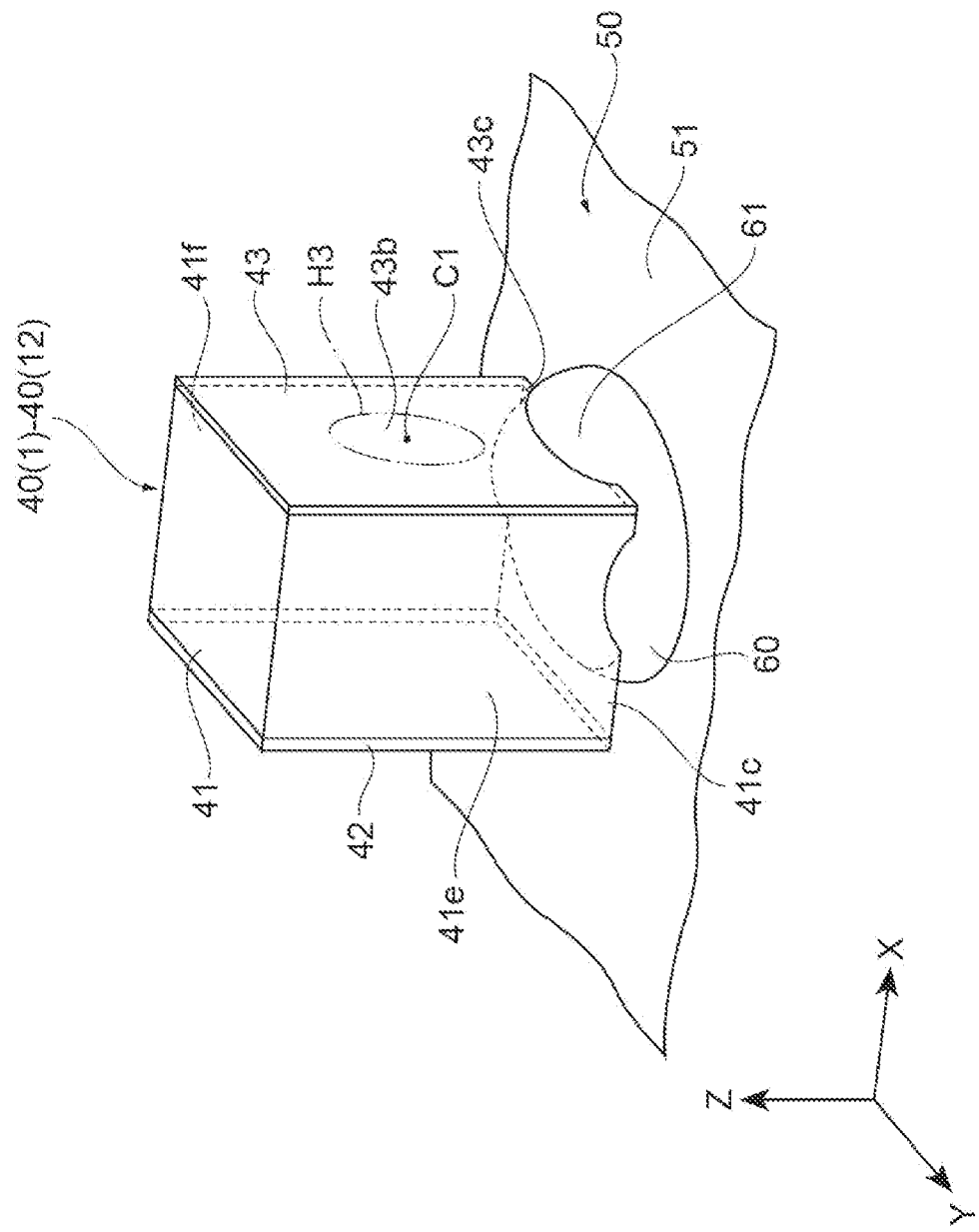
FIG. 13 is a perspective view illustrating a wavelength selective filter according to a third modification of the first embodiment.

A third modification of the wavelength multiplexer/demultiplexer according to the first embodiment will be described with reference to FIG. 13. FIG. 13 is a perspective view illustrating wavelength selective filters 40(1) to 40(M) according to a third modification.

In the present modification, bonding portion 60 is in contact with not only bottom surface 41c of substrate 41 but also second surface 43b and third surface 43c of antireflection film 43, and first side surface 41e and second side surface 41*f* of substrate 41. Bonding portion 60 is in direct contact with second surface 43*b* and third surface 43*c*, and first side surface 41*e* and second side surface 41*f*. Similarly to the first modification, contact part 61 of bonding portion 60 in contact with antireflection film 43 is located at a distance of 300 μm or more from center C1 of second main surface 41*b* when viewed in the X direction.

In the present modification, bonding portion 60 is in contact with second surface 43*b* and third surface 43*c* of antireflection film 43, and first side surface 41*e* and second side surface 41*f* of substrate 41. Thus, the contact area between each of wavelength selective filters 40(1) to 40(M) and bonding portion 60 increases, and each of wavelength selective filters 40(1) to 40(M) is more firmly fixed to base plate 50 by bonding portion 60. Therefore, even when a physical external force is applied to, for example, wavelength selective filters 40(1) to 40(M), the deviation of positions and directions of wavelength selective filters 40(1) to 40(M) is less likely to occur, and an increase in insertion loss due to wavelength selective filters 40(1) to 40(M) can be suppressed.

In the present modification, contact part 61 of bonding portion 60 in contact with antireflection film 43 is located at a distance of 300 μm or more from center C1 of second main surface 41*b* when viewed in the X direction. Since contact part 61 of bonding portion 60 is positioned away from center C1 of second main surface 1*b* to some extent, it is possible to suppress the optical signal transmitted through each of wavelength selective filters 40(1) to 40(M) from being blocked by bonding portion 60.

Second Embodiment

Figure 14:
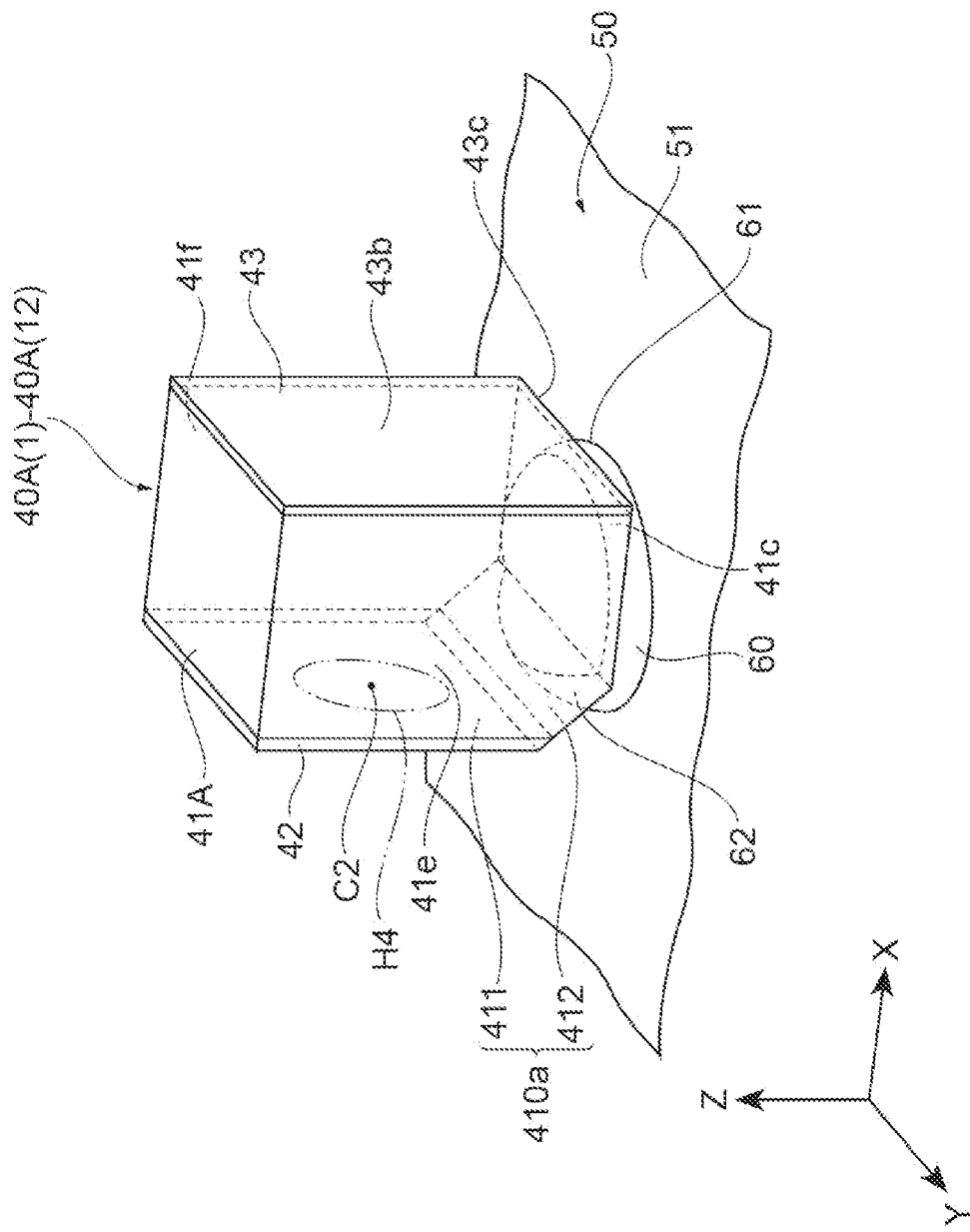
FIG. 14 is a perspective view illustrating a wavelength selective filter according to a second embodiment.
Figure 15:
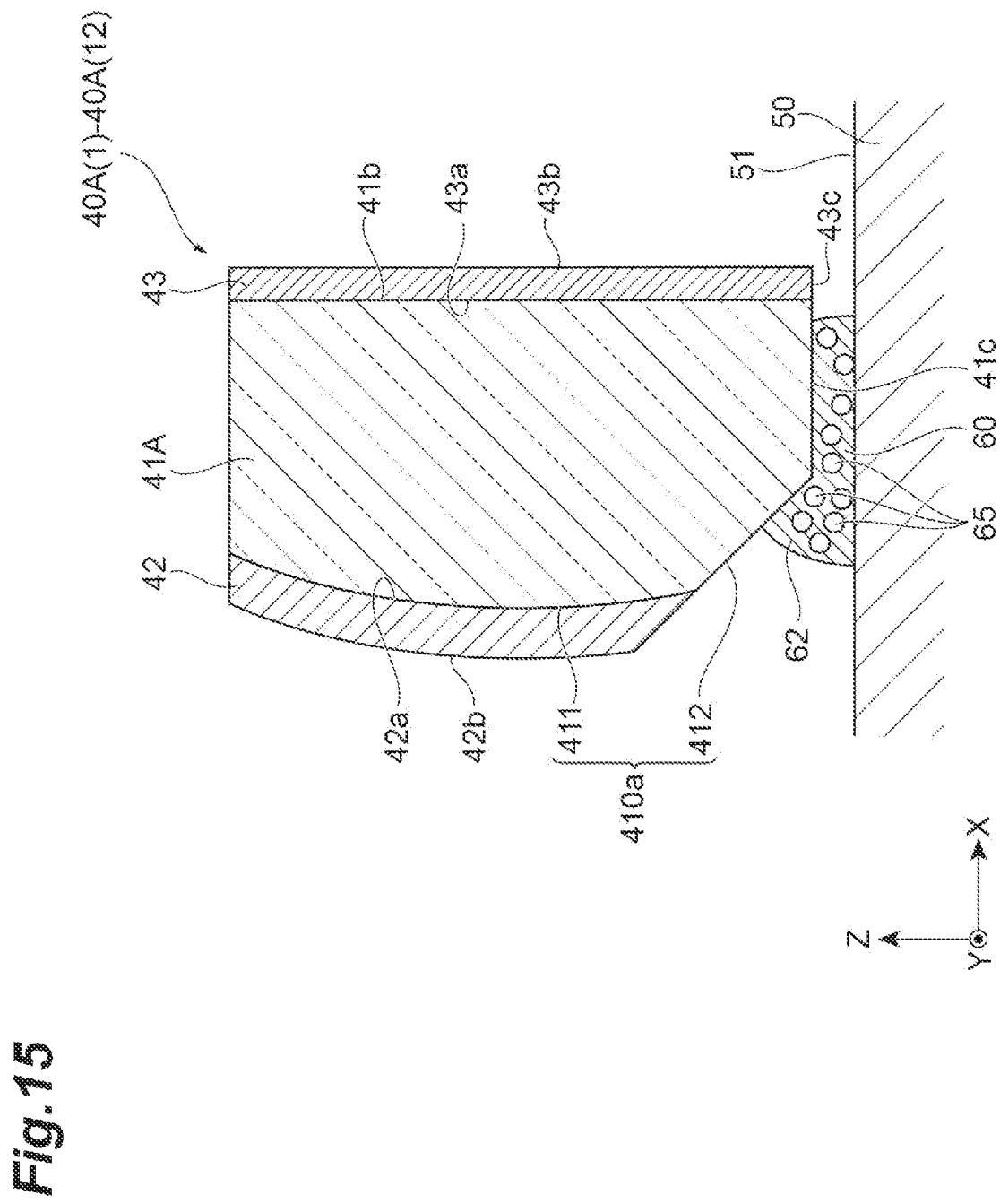
FIG. 15 is a cross-sectional view of the wavelength selective filter according to the second embodiment.
Figure 16:
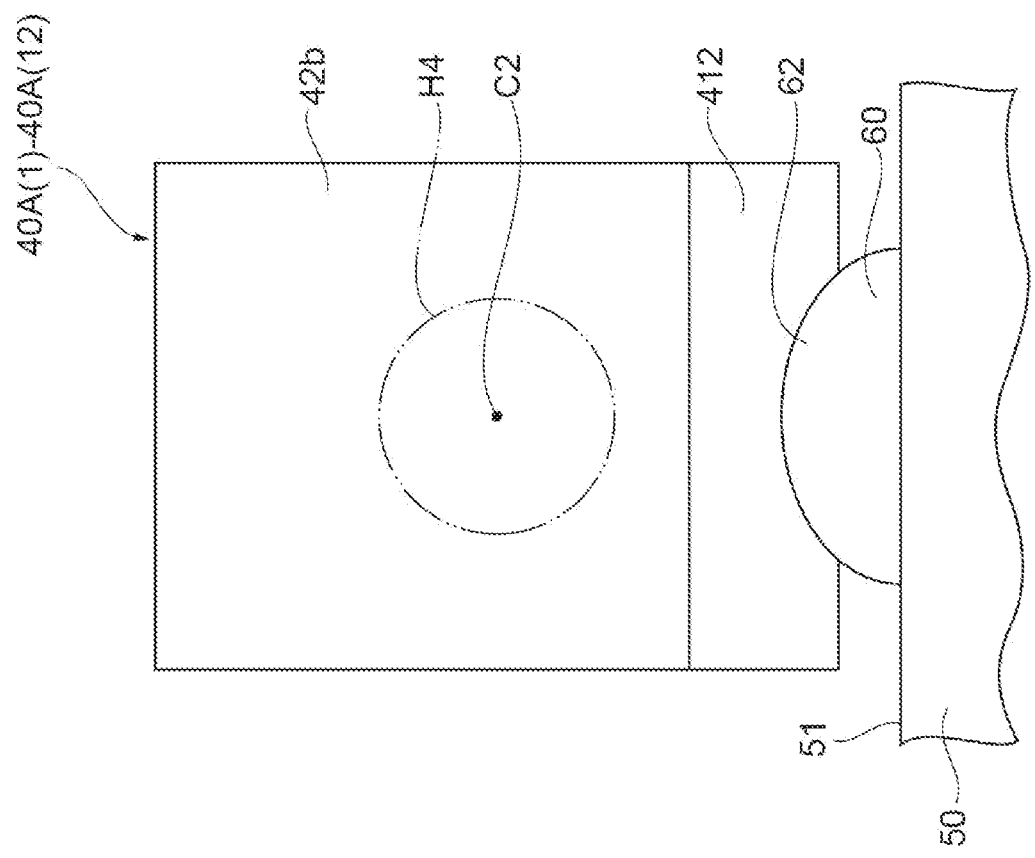
FIG. 16 is a diagram of the wavelength selective filter according to the second embodiment as viewed from a multilayer film side.

A wavelength multiplexer/demultiplexer according to a second embodiment will be described with reference to FIGS. 14 to 16. FIG. 14 is a perspective view illustrating wavelength selective filters 40A(1) to 40A(M) according to the second embodiment. FIG. 15 is a cross-sectional view of wavelength selective filters 40A(1) to 40A(M) according to the second embodiment. FIG. 16 is a diagram of wavelength selective filters 40A(1) to 40A(M) according to the second embodiment viewed from multilayer film 42 side. In the following description, points different from wavelength selective filters 40(1) to 40(M) according to the first embodiment will be mainly described, and description of similar points will be omitted.

Similarly to wavelength selective filters 40(1) to 40(M), each of wavelength selective filters 40A(1) to 40A(M) includes a substrate 41A, multilayer film 42, and antireflection film 43. Substrate 41A includes a first main surface 410*a*, a second main surface 41*b*, a bottom surface 41*c*, a first side surface 41*e*, and a second side surface 41*f*. As shown in FIG. 15, first main surface 410*a* of substrate 41A includes a first part 411 opposed to second main surface 41*b* in the X direction, and a second part 412 inclined with respect to first part 411 and bottom surface 41*c*.

First part 411 is a curved surface convex toward the outer side of substrate 41A. Second part 412 is a flat surface inclined with respect to the X direction and the Z direction. Second part 412 is located closer to bottom surface 41*c* than first part 411, and connects first part 411 and bottom surface 41*c*. Second part 412 is formed by, for example, chamfering a corner portion of substrate 41A. FIG. 16 shows a center C2 of first main surface 410*a* of substrate 41A when viewed from the X direction, and an imaginary circle H4 having center C2 as the center. The optical signals transmitted through wavelength selective filters 40A(1) to 40A(M) pass through, for example, center C2. In the embodiment of the present disclosure, the radius of imaginary circle H4 is 300 μm. Second part 412 is located outside imaginary circle H4 when viewed from the X direction. That is, second part 412 is positioned away from center C2 of first main surface 410*a* by 300 μm or more when viewed from the X direction.

Multilayer film 42 is formed on first part 411 and is not formed on second part 412. That is, second part 412 includes an exposed region exposed from multilayer film 42. In the embodiment of the present disclosure, the entire second part 412 corresponds to the exposed region. For example, multilayer film 42 may be formed on first part 411 and second part 412, and then a portion of multilayer film 42 located on second part 412 may be removed by etching.

Bonding portion 60 is in contact with bottom surface 41*c* of substrate 41A and second part 412 of first main surface 410*a*, and is in non-contact with multilayer film 42. Bonding portion 60 is in direct contact with bottom surface 41*c* and second part 412. A contact part 62 in contact with the exposed region (second part 412) of bonding portion 60 is located outside imaginary circle H4 when viewed from the X direction. That is, contact part 62 is located at a distance of 300 μm or more from center C2 of first main surface 410*a* when viewed from the X direction.

In the embodiment, first main surface 410*a* of substrate 41A includes an exposed region on which multilayer film 42 is not formed, and bonding portion 60 is in contact with the exposed region. In this embodiment, first main surface 410*a* includes first part 411 opposed to second main surface 41*b* in the X direction, and second part 412 inclined with respect to first part 411 and bottom surface 41*c* of substrate 41A and connecting first part 411 and bottom surface 41*c*. Second part 412 includes the exposed region. Since bonding portion 60 is in contact with not only bottom surface 41*c* of substrate 41A but also a part of first main surface 410*a*, a contact area between each of wavelength selective filters 40A(1) to 40A(M) and bonding portion 60 increases, and wavelength selective filters 40A(1) to 40A(M) are more firmly fixed to base plate 50 by bonding portion 60. Therefore, even when a physical external force is applied to, for example, wavelength selective filters 40A(1) to 40A(M), the deviation of the positions and directions of wavelength selective filters 40A(1) to 40A(M) is less likely to occur, and an increase in insertion loss due to wavelength selective filters 40A(1) to 40A(M) can be suppressed.

In this embodiment, contact part 62 of bonding portion 60 in contact with the exposed region is located at a distance of 300 μm or more from center C2 of first main surface 410*a* when viewed from the X direction. Since contact part 62 of bonding portion 60 is positioned away from center C2 of first main surface 410*a* to some extent, it is possible to suppress the optical signal transmitted through wavelength selective filters 40A(1) to 40A(M) from being blocked by bonding portion 60.

First Modification of Second Embodiment

Figure 17:
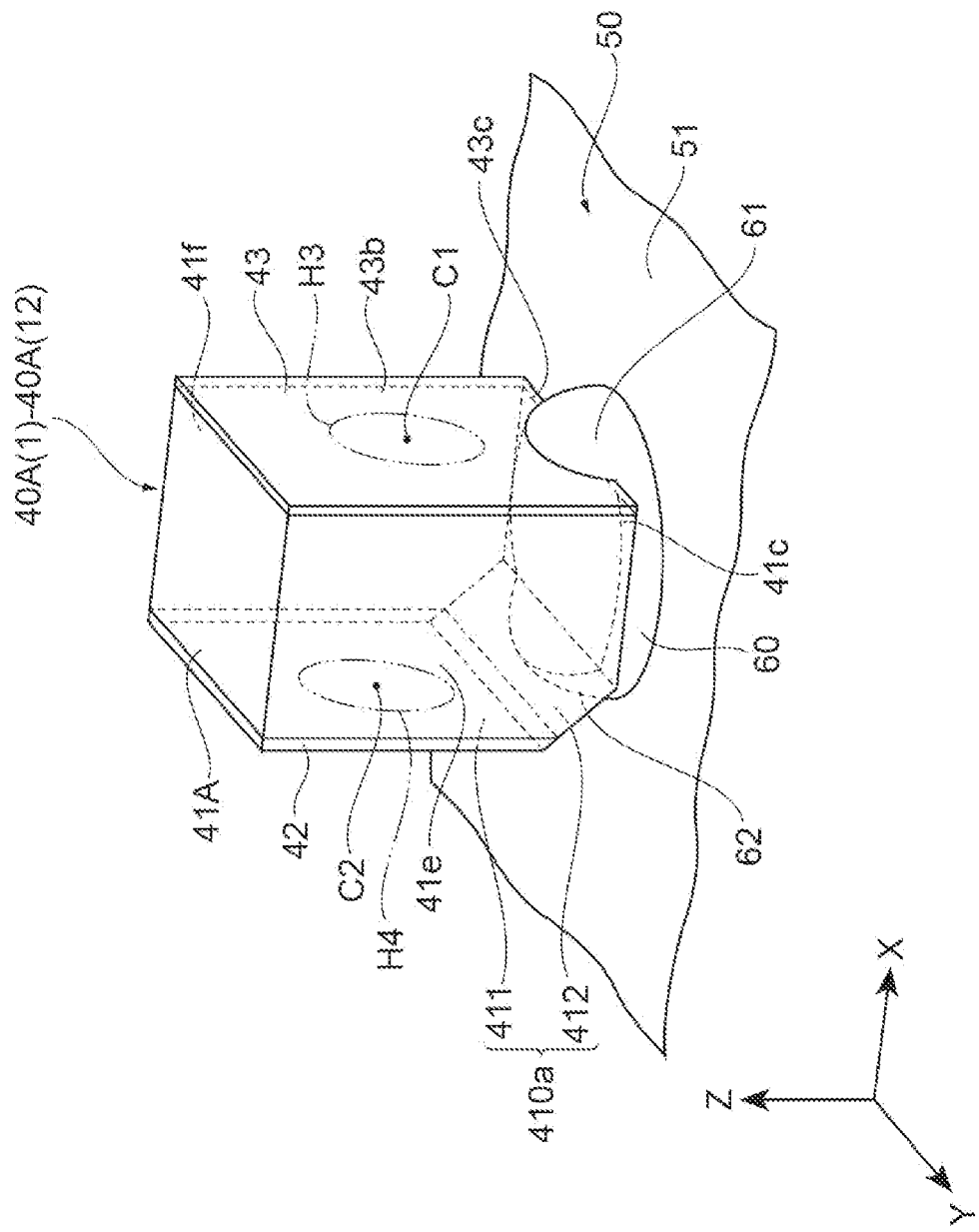
FIG. 17 is a perspective view illustrating a wavelength selective filter according to a first modification of the second embodiment.

A first modification of the wavelength multiplexer/demultiplexer according to the second embodiment will be described with reference to FIG. 17. FIG. 17 is a perspective view illustrating wavelength selective filters 40A(1) to 40A(M) according to the first modification.

In the present modification, bonding portion 60 is in contact with not only bottom surface 41*c* and second part 412 of first main surface 410*a* of substrate 41A but also second surface 43*b* and third surface 43*c* of antireflection film 43. Bonding portion 60 is in direct contact with second surface 43b and third surface 43c. Contact part 61 of bonding portion 60 in contact with antireflection film 43 is located at a distance of 300 μm or more from center C1 of second main surface 41b when viewed in the X direction.

In the present modification, bonding portion 60 is in contact with second surface 43b and third surface 43c of antireflection film 43. Thus, a contact area between each of wavelength selective filters 40A(1) to 40A(M) and bonding portion 60 increases, and wavelength selective filters 40A(1) to 40A(M) are more firmly fixed to base plate 50 by bonding portion 60. Therefore, even when a physical external force is applied to, for example, wavelength selective filters 40A(1) to 40A(M), the deviation of the positions and directions of wavelength selective filters 40A(1) to 40A(M) is less likely to occur, and an increase in insertion loss due to wavelength selective filters 40A(1) to 40A(M) can be suppressed.

In the present modification, contact part 61 of bonding portion 60 in contact with antireflection film 43 is located at a distance of 300 μm or more from center C1 of second main surface 41b when viewed in the X direction. Since contact part 61 of bonding portion 60 is positioned away from center C1 of second main surface 41b to some extent, it is possible to suppress the optical signal transmitted through wavelength selective filters 40A(1) to 40A(M) from being blocked by bonding portion 60.

Second Modification of Second Embodiment

Figure 18:
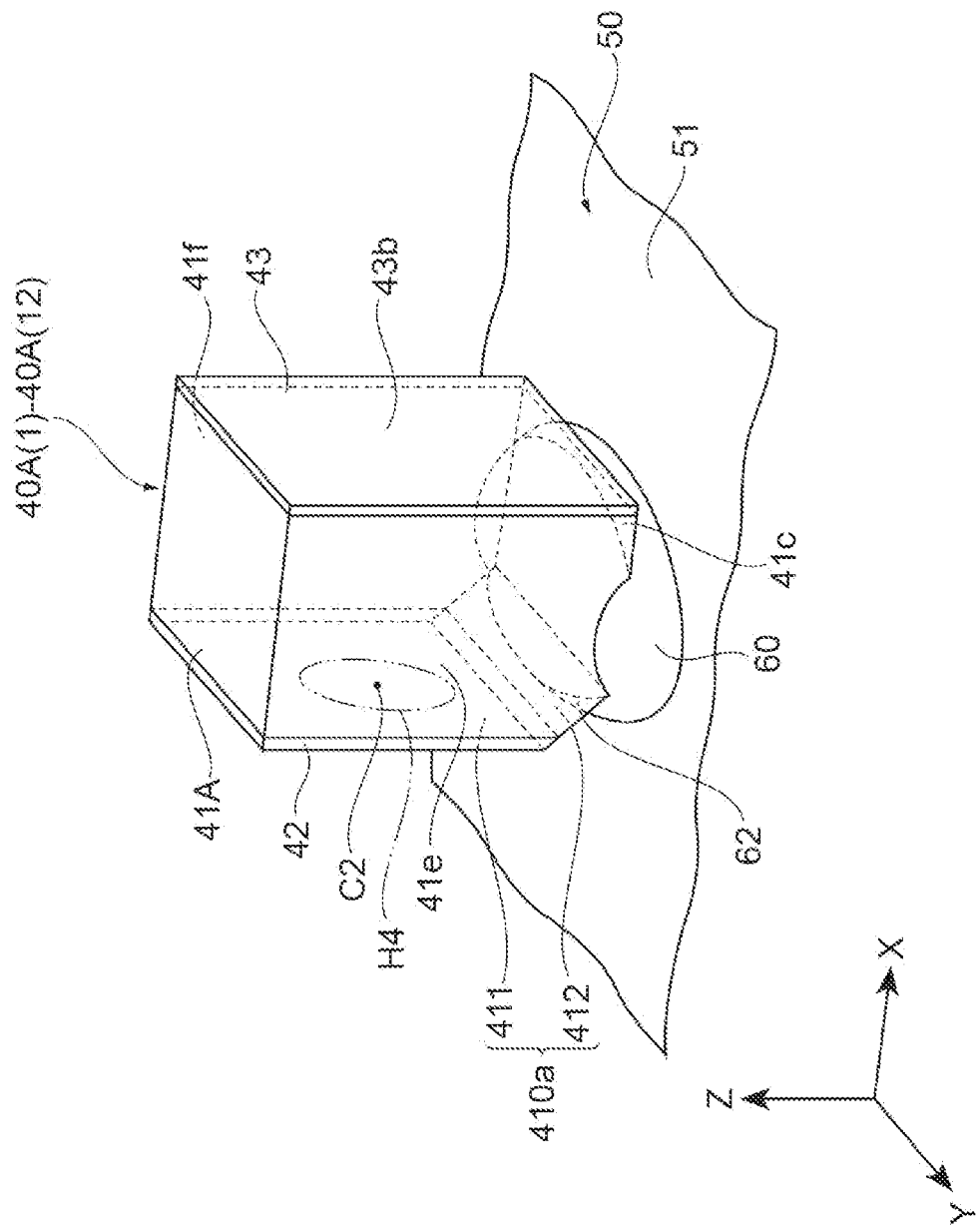
FIG. 18 is a perspective view illustrating a wavelength selective filter according to a second modification of the second embodiment.

A second modification of the wavelength multiplexer/demultiplexer according to the second embodiment will be described with reference to FIG. 18. FIG. 18 is a perspective view illustrating wavelength selective filters 40A(1) to 40A(M) according to the second modification. In the second modification, bonding portion 60 is in contact with not only bottom surface 41c and second part 412 of first main surface 410a of substrate 41A but also first side surface 41e and second side surface 41f of substrate 41A. Bonding portion 60 is in direct contact with first side surface 41e and second side surface 41f.

In the present modification, bonding portion 60 is in contact with first side surface 41e and second side surface 41f of substrate 41A. Thus, a contact area between each of wavelength selective filters 40A(1) to 40A(M) and bonding portion 60 increases, and wavelength selective filters 40A(1) to 40A(M) are more firmly fixed to base plate 50 by bonding portion 60. Therefore, even when a physical external force is applied to, for example, wavelength selective filters 40A(1) to 40A(M), the deviation of the positions and directions of wavelength selective filters 40A(1) to 40A(M) is less likely to occur, and an increase in insertion loss due to wavelength selective filters 40A(1) to 40A(M) can be suppressed.

Third Modification of Second Embodiment

Figure 19:
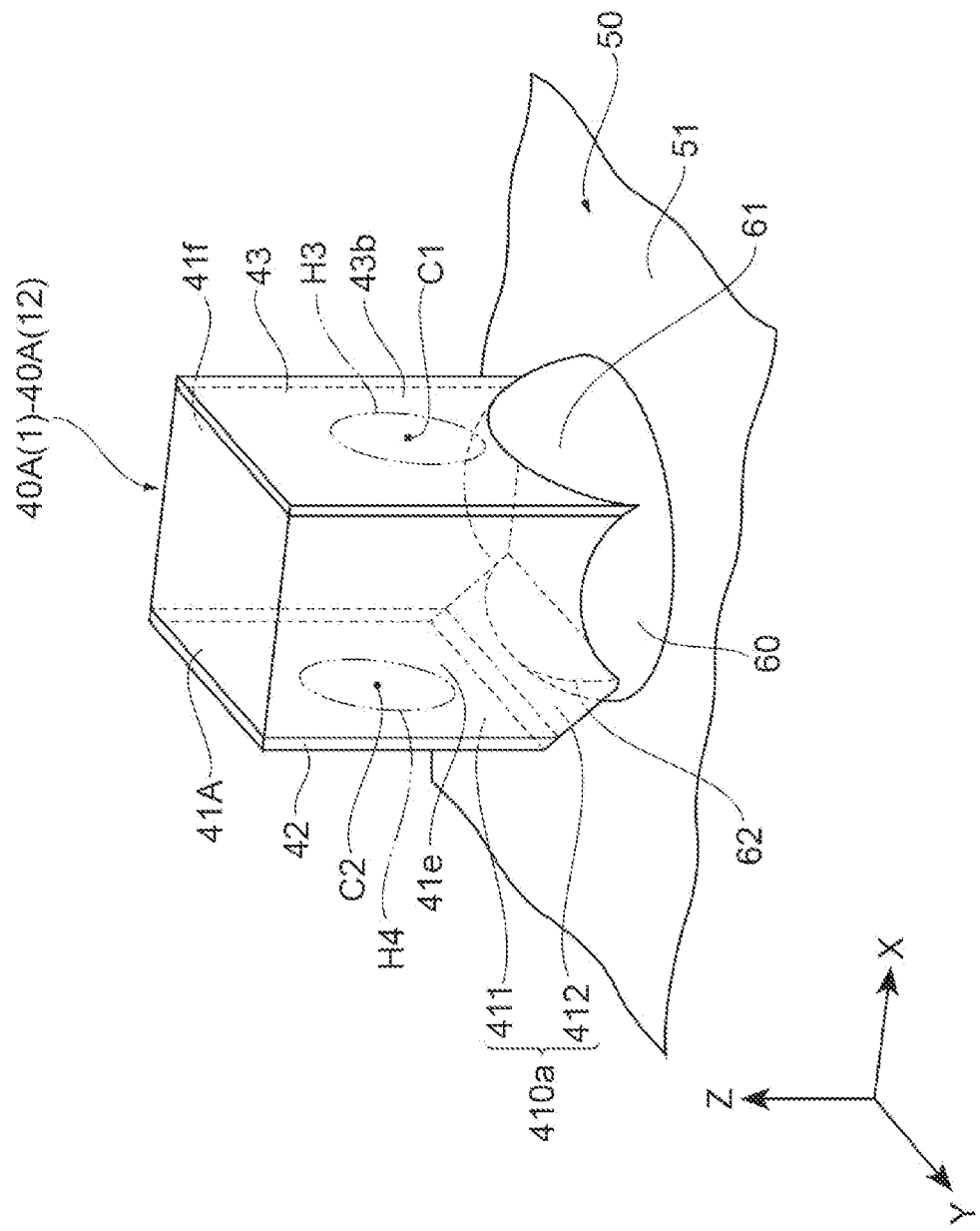
FIG. 19 is a perspective view illustrating a wavelength selective filter according to a third modification of the second embodiment.
Figure 20:
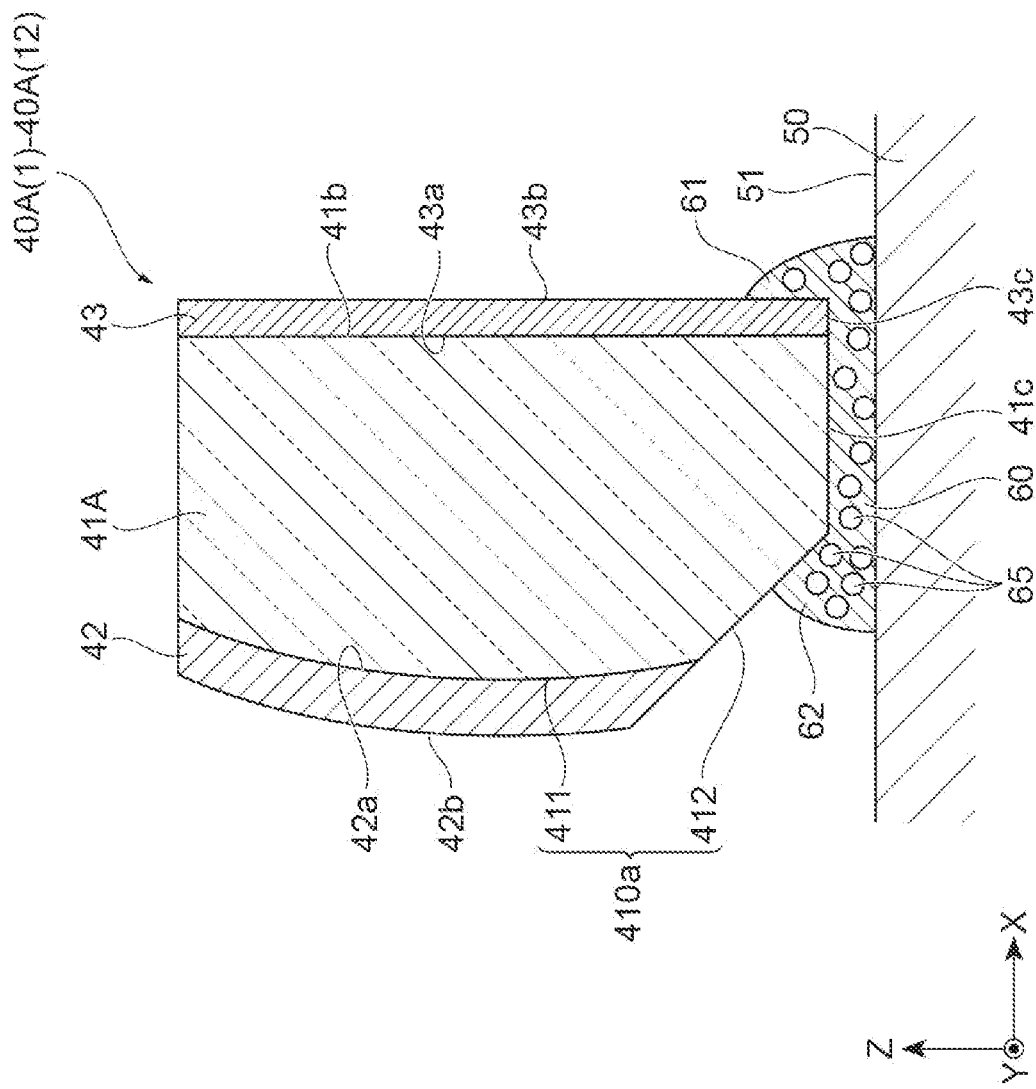
FIG. 20 is a cross-sectional view of the wavelength selective filter according to the third modification of the second embodiment.

A third modification of the wavelength multiplexer/demultiplexer according to the second embodiment will be described with reference to FIGS. 19 and 20. FIG. 19 is a perspective view illustrating wavelength selective filters 40A(1) to 40A(M) according to the third modification. FIG. 20 is a cross-sectional view of wavelength selective filters 40A(1) to 40A(M) according to the third modification.

In the present modification, bonding portion 60 is in contact with not only bottom surface 41c and second part 412 of first main surface 410a of substrate 41A, but also second surface 43b and third surface 43c of antireflection film 43 and first side surface 41e and second side surface 41f of substrate 41A. Bonding portion 60 is in direct contact with second surface 43b and third surface 43c, and first side surface 41e and second side surface 41f. Similarly to the first modification of second embodiment, contact part 61 of bonding portion 60 in contact with antireflection film 43 is located at a distance of 300 μm or more from center C1 of second main surface 41b when viewed in the X direction.

In the present modification, bonding portion 60 is in contact with second surface 43b and third surface 43c of antireflection film 43, and first side surface 41e and second side surface 41f of substrate 41A. Thus, a contact area between wavelength selective filters 40A(1) to 40A(M) and bonding portion 60 increases, and wavelength selective filters 40A(1) to 40A(M) are more firmly fixed to base plate 50 by bonding portion 60. Therefore, even when a physical external force is applied to, for example, wavelength selective filters 40A(1) to 40A(M), the deviation of the positions and directions of wavelength selective filters 40A(1) to 40A(M) is less likely to occur, and an increase in insertion loss due to wavelength selective filters 40A(1) to 40A(M) can be suppressed.

In this modification, contact part 61 of bonding portion 60 in contact with antireflection film 43 is located at a distance of 300 μm or more from center C1 of second main surface 41b when viewed in the X direction. Since contact part 61 of bonding portion 60 is positioned away from center C1 of second main surface 41b to some extent, it is possible to suppress the optical signal transmitted through wavelength selective filters 40A(1) to 40A(M) from being blocked by bonding portion 60.

Third Embodiment

Figure 21:
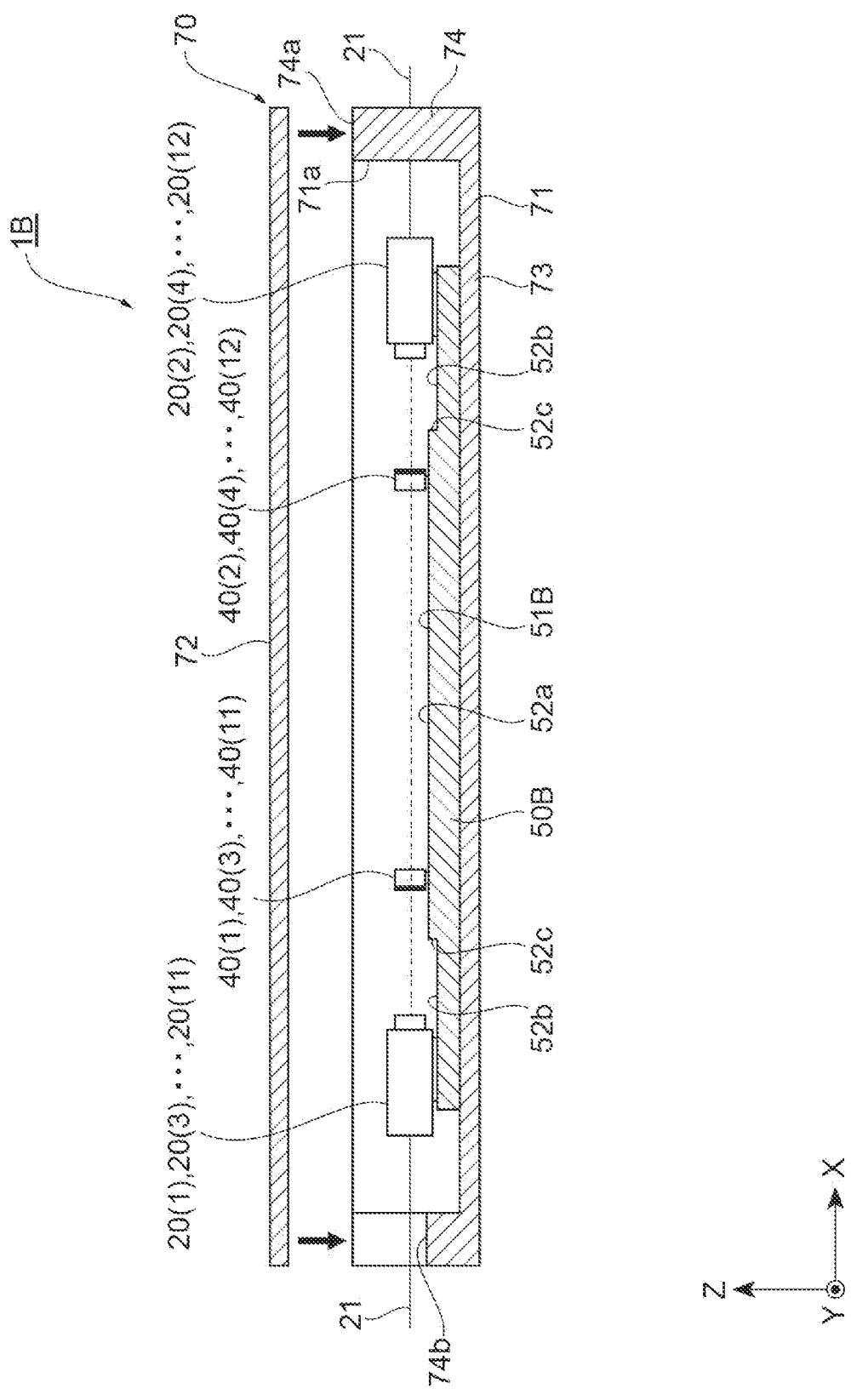
FIG. 21 is a schematic cross-sectional view of a wavelength multiplexer/demultiplexer according to a third embodiment.

A wavelength multiplexer/demultiplexer according to a third embodiment will be described with reference to FIG. 21. FIG. 21 is a schematic cross-sectional view of a wavelength multiplexer/demultiplexer 1B according to the third embodiment. In the following description, points different from wavelength multiplexer/demultiplexer 1 according to the first embodiment will be mainly described, and description of similar points will be omitted.

Wavelength multiplexer/demultiplexer 1B includes first collimator 10, M-number of second collimators 20(1) to 20(M), M-number of wavelength selective filters 40(1) to 40(M), a base plate 50B, bonding portion 60, and housing 70. Wavelength multiplexer/demultiplexer 1B is different from wavelength multiplexer/demultiplexer 1 of the first embodiment in the configuration of base plate 50B.

A placement surface 51B of base plate 50B includes a first placement part 52a and a pair of second placement parts 52b. First placement part 52a is located between the pair of second placement parts 52b in the X direction. First placement part 52a and second placement parts 52b extend flatly along the X direction and the Y direction. A height of first placement part 52a in the Z direction with reference to bottom plate 73 of housing 70 is different from a height of second placement part 52b. First placement part 52a is located farther away from bottom plate 73 than second placement part 52b. That is, a thickness of the portion corresponding to first placement part 52a in base plate 50B is larger than a thickness of the portion corresponding to second placement part 52b. First placement part 52a and the pair of second placement parts 52b are connected by a pair of stepped surfaces 52c.

Wavelength selective filters 40(1) to 40(M) are placed on first placement part 52a, and second collimators 20(1) to 20(M) are placed on the pair of second placement parts 52b. Specifically, second collimators 20(1), 20(3), ..., 20(M–1) in odd-numbered places are placed on one second placement part 52b, and second collimators 20(2), 20(4), ..., 20(M) in even-numbered places are placed on the other second placement part 52b. First collimator 10 (see FIG. 1) is further placed on the other second placement part 52b.

In this embodiment, base plate 50B includes first placement part 52a and second placement part 52b having different heights from bottom plate 73. Wavelength selective filters 40(1) to 40(M) are placed on first placement part 52a, and first collimator 10 and second collimators 20(1) to 20(M) are placed on second placement parts 52b. In this case, it is possible to appropriately optically couple wavelength selective filters 40(1) to 40(M) placed on first placement part 52a to first collimator 10 and second collimators 20(1) to 20(M) placed on second placement parts 52b. For example, since the sizes of wavelength selective filters 40(1) to 40(M) in the Z direction are generally smaller than the sizes of first collimator 10 and second collimators 20(1) to 20(M), it is possible to appropriately match the optical axes of wavelength selective filters 40(1) to 40(M) with the optical axes of first collimator 10 and second collimators 20(1) to 20(M) by designing base plate 50B so that first placement part 52a is higher than second placement part 52b.

Fourth Embodiment

Figure 22:
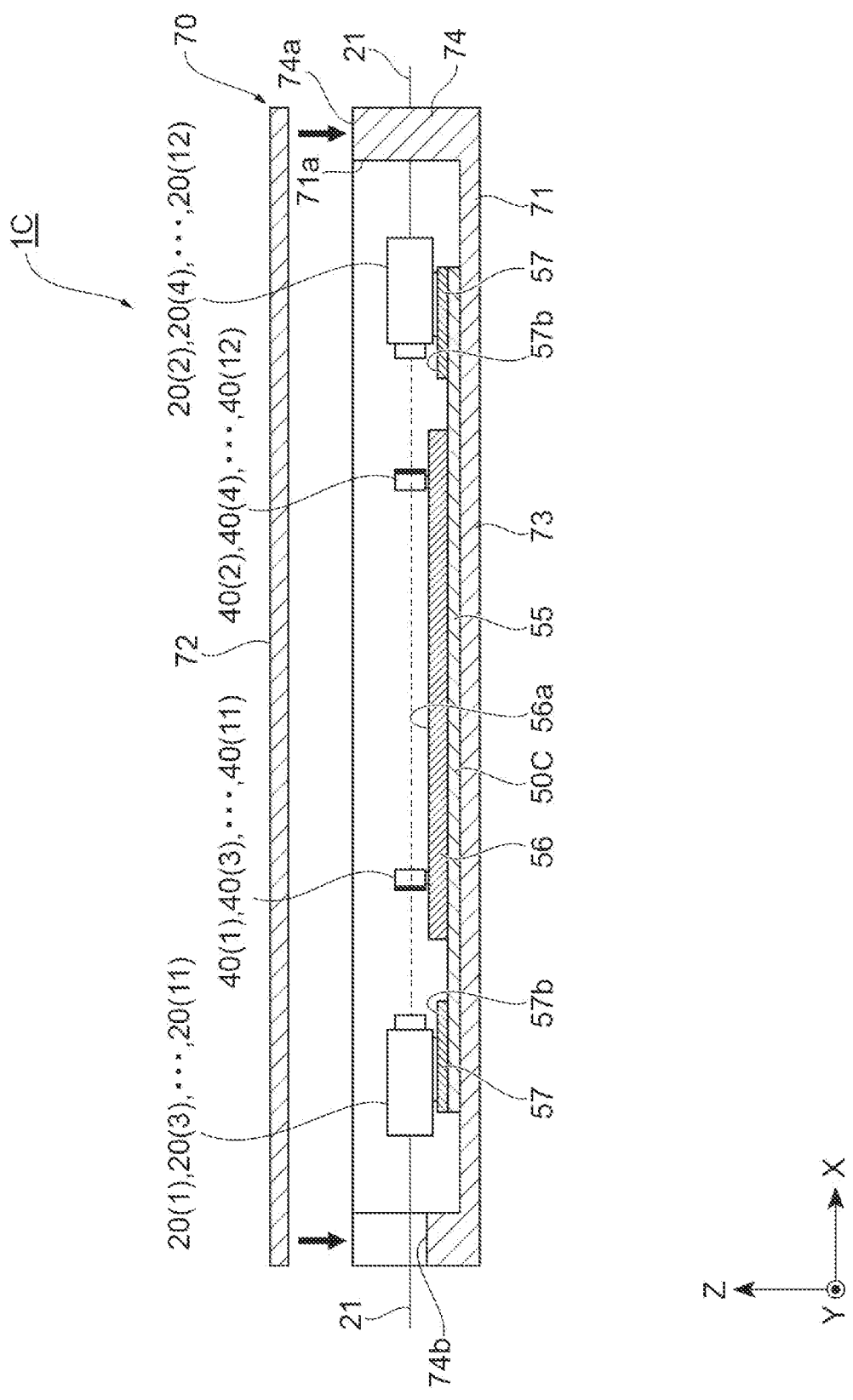
FIG. 22 is a schematic cross-sectional view of a wavelength multiplexer/demultiplexer according to a fourth embodiment.

A wavelength multiplexer/demultiplexer according to a fourth embodiment will be described with reference to FIG. 22. FIG. 22 is a schematic cross-sectional view of a wavelength multiplexer/demultiplexer 1C according to the fourth embodiment. In the following description, points different from wavelength multiplexer/demultiplexer 1 according to the first embodiment will be mainly described, and description of similar points will be omitted.

Wavelength multiplexer/demultiplexer 1C includes first collimator 10, M-number of second collimators 20(1) to 20(M), M-number of wavelength selective filters 40(1) to 40(M), a base plate 50C, bonding portion 60, and housing 70. Wavelength multiplexer/demultiplexer 1C is different from wavelength multiplexer/demultiplexer 1 of the first embodiment in the configuration of base plate 50C.

Base plate 50C includes a main base plate 55 disposed on bottom plate 73 of housing 70, and a first base plate 56 and a pair of second base plates 57 disposed on main base plate 55. Main base plate 55, first base plate 56, and second base plates 57 are plate-shaped members extending along the X direction and the Y direction. Main base plate 55 is fixed to bottom plate 73, and first base plate 56 and second base plates 57 are fixed to main base plate 55. First base plate 56 is separate from the pair of second base plates 57, and is positioned between the pair of second base plates 57 in the X direction.

First base plate 56 includes a placement surface 56a on which wavelength selective filters 40(1) to 40(M) are placed. Placement surface 56a extends flatly along the X direction and the Y direction. Each of the pair of second base plates 57 includes a placement surface 57b on which second collimators 20(1) to 20(M) are placed. Placement surface 57b extends flatly along the X direction and the Y direction. Second collimators 20(1), 20(3), ..., 20(M–1) in odd-numbered places are placed on placement surface 57b of one second base plate 57, and second collimators 20(2), 20(4), ..., 20(M) in even-numbered places are placed on placement surface 57b of the other second base plate 57. First collimator 10 (see FIG. 1) is further placed on placement surface 57b of the other second base plate 57.

A height of placement surface 56a in the Z direction with reference to bottom plate 73 of housing 70 is different from a height of placement surface 57b. Placement surface 56a is located further away from bottom plate 73 than placement surface 57b. That is, a thickness of first base plate 56 is larger than a thickness of second base plate 57.

In this embodiment, base plate 50C includes first base plate 56 on which M-number of wavelength selective filters 40(1) to 40(M) are placed, and second base plates 57 which are separate from first base plate 56 and on which first collimator 10 and M-number of second collimators 20(1) to 20(M) are placed. Thus, it is possible to independently design first base plate 56 on which wavelength selective filters 40(1) to 40(M) are placed and second base plates 57 on which first collimator 10 and second collimators 20(1) to 20(M) are placed. Accordingly, it is possible to improve the degree of freedom in arrangement of wavelength selective filters 40(1) to 40(M), first collimator 10, and second collimators 20(1) to 20(M).

Fifth Embodiment

Figure 23:
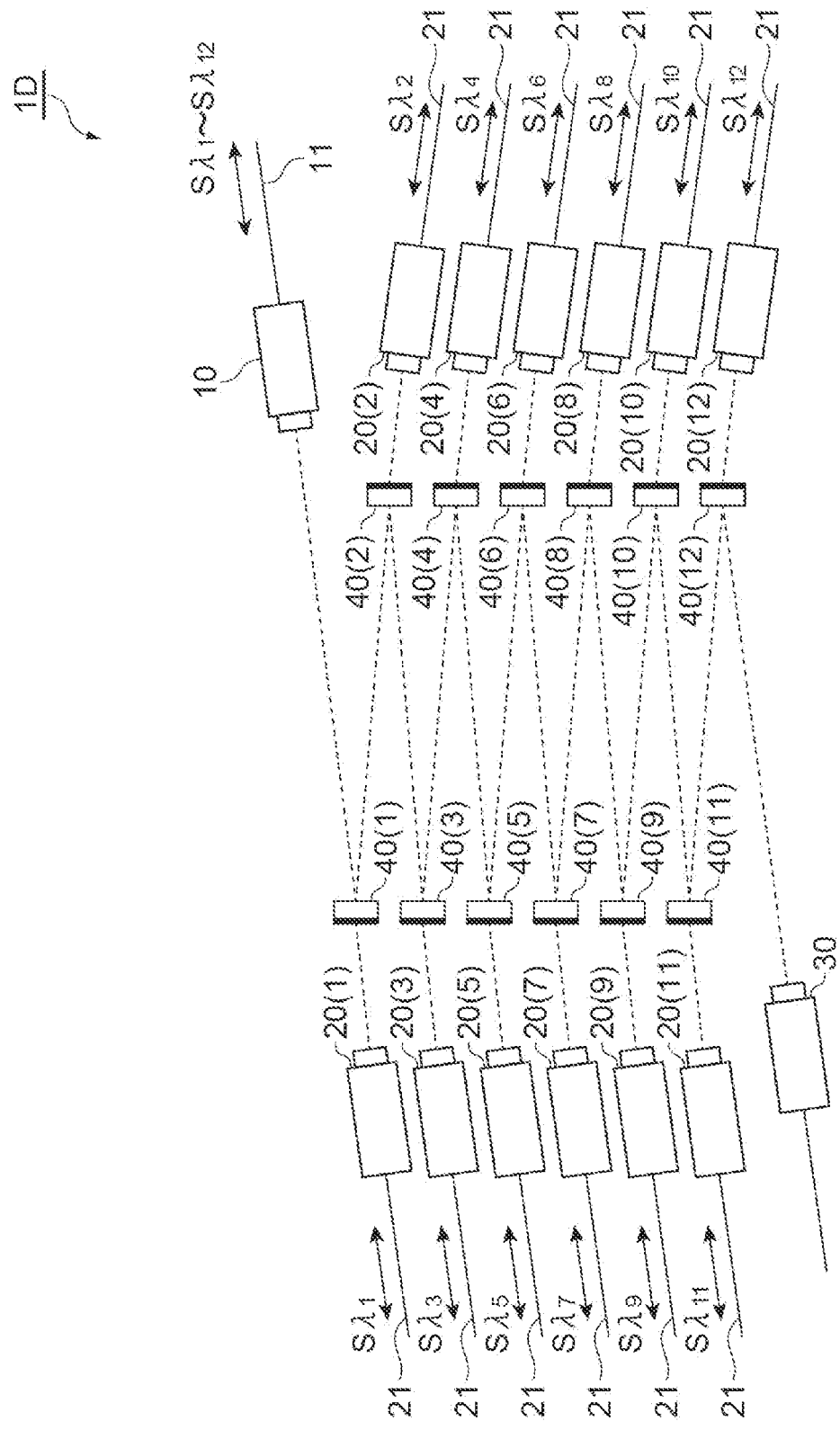
FIG. 23 is a schematic diagram illustrating a configuration of a wavelength multiplexer/demultiplexer according to a fifth embodiment.

A wavelength multiplexer/demultiplexer according to a fifth embodiment will be described with reference to FIG. 23. FIG. 23 is a schematic diagram illustrating the configuration of a wavelength multiplexer/demultiplexer 1D according to the fifth embodiment. In the following description, points different from wavelength multiplexer/demultiplexer 1 according to the first embodiment will be mainly described, and description of similar points will be omitted.

Wavelength multiplexer/demultiplexer 1D further includes a third collimator 30 in addition to the configuration of wavelength multiplexer/demultiplexer 1 of the first embodiment. Third collimator 30 may be used as an upgrade port. The configuration of third collimator 30 is similar to that of first collimator 10. Third collimator 30 is disposed to face second main surface 41b of substrate 41 of wavelength selective filter 40(M), and is optically coupled to second main surface 41b of substrate 41 of wavelength selective filter 40(M) through a space.

In this embodiment, wavelength multiplexer/demultiplexer 1D further comprises third collimator 30 optically coupled to wavelength selective filter 40(M) in the Mth place. By using third collimator 30 as an upgrade port, the number of channels of wavelength multiplexer/demultiplexer 1D can be increased as necessary.

Sixth Embodiment

Figure 24:
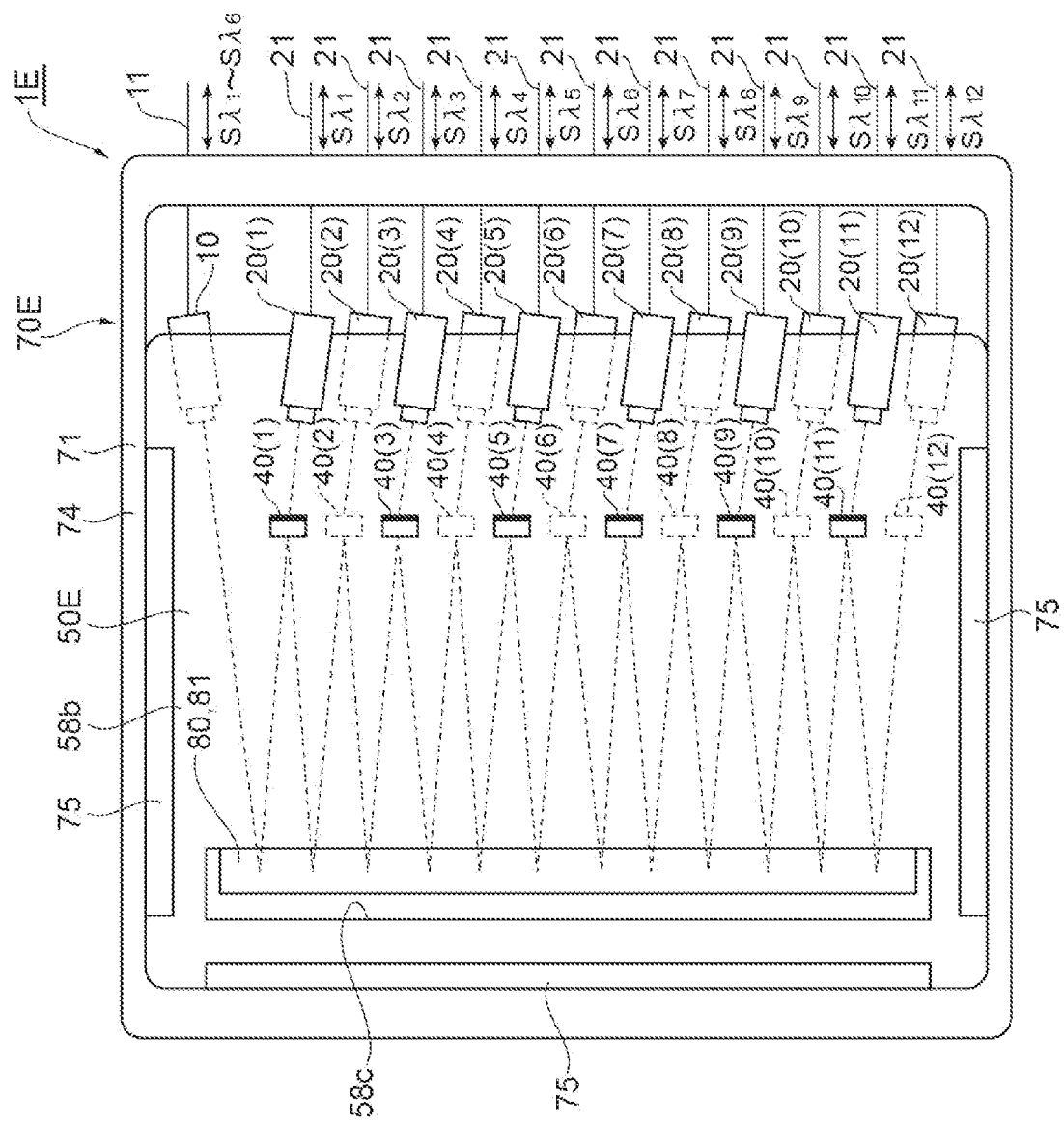
FIG. 24 is a schematic plan view of a wavelength multiplexer/demultiplexer according to a sixth embodiment.
Figure 25:
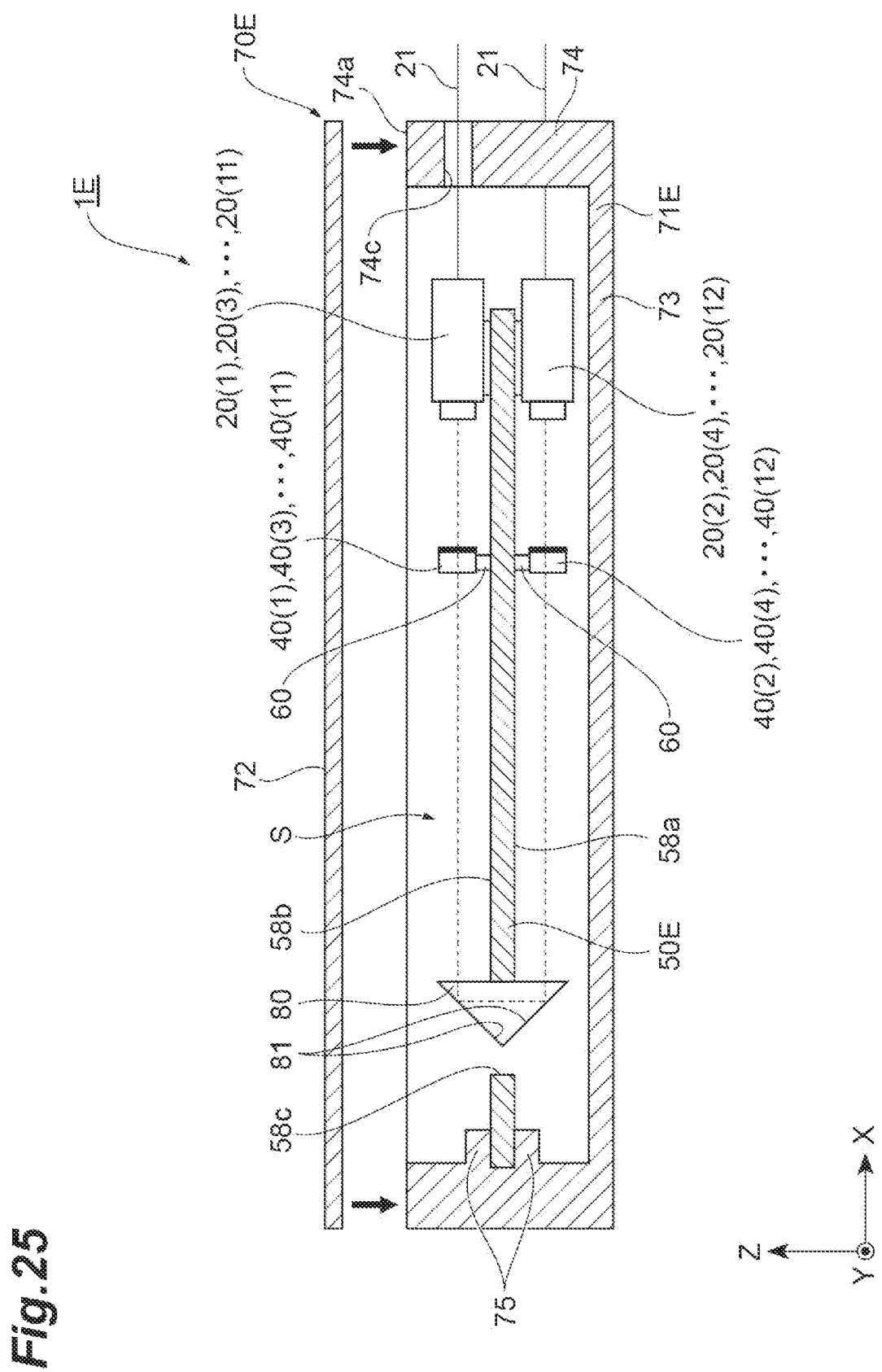
FIG. 25 is a schematic cross-sectional view of the wavelength multiplexer/demultiplexer shown in FIG. 24.

A wavelength multiplexer/demultiplexer according to a sixth embodiment will be described with reference to FIGS. 24 and 25. FIG. 24 is a schematic plan view of a wavelength multiplexer/demultiplexer 1E according to the sixth embodiment. FIG. 25 is a schematic cross-sectional view of wavelength multiplexer/demultiplexer 1E shown in FIG. 24. In the following description, points different from wavelength multiplexer/demultiplexer 1 according to the first embodiment will be mainly described, and description of similar points will be omitted.

Wavelength multiplexer/demultiplexer 1E includes first collimator 10, M-number of second collimators 20(1) to 20(M), M-number of wavelength selective filters 40(1) to 40(M), a base plate 50E, bonding portion 60, a housing 70E, and an optical element 80. Base plate 50E includes a first placement surface 58a and a second placement surface 58b that opposite to each other in the Z direction. First placement surface 58a and second placement surface 58b extend flatly along the X direction and the Y direction. First placement surface 58a is located closer to bottom plate 73 than second placement surface 58b. Base plate 50E is formed with a hole portion 58c that opens at first placement surface 58a and second placement surface 58b. Hole portion 58c is formed in a rectangular shape having long sides along the Y direction when viewed from the Z direction. Optical element 80 described later is disposed inside hole portion 58c.

First collimator 10, second collimators 20(2), 20(4), . . . , 20(M) in even-numbered places, and wavelength selective filters 40(2), 40(4), . . . , 40(M) in even-numbered places are placed on first placement surface 58a. Second collimators 20(1), 20(3), . . . , 20(M−1) in odd-numbered places and wavelength selective filters 40(1), 40(3), . . . , 40(M−1) in odd-numbered places are placed on second placement surface 58b. That is, the positions of second collimators 20(1), 20(3), . . . , and 20(M−1) in odd-numbered places in the Z direction are different from those of second collimators 20(2), 20(4), . . . , and 20(M) in even-numbered places. Similarly, the positions of wavelength selective filters 40(1), 40(3), . . . , 40(M−1) in odd-numbered places in the Z direction are different from those of wavelength selective filters 40(2), 40(4), . . . , 40(M) in even-numbered places. Base plate 50E is disposed between wavelength selective filters 40(1), 40(3), . . . , 40(M−1) in odd-numbered places and wavelength selective filters 40(2), 40(4), . . . , 40(M) in even-numbered places. When viewed from the Z direction, second collimators 20(1) to 20(M) are arranged in a line along the Y direction in this order. Similarly, when viewed from the Z direction, wavelength selective filters 40(1) to 40(M) are arranged in a line along the Y direction in this order.

When viewed from the Z direction, second collimators 20(1), 20(3), . . . , and 20(M−1) in odd-numbered places may be disposed so as to partially overlap second collimators 20(2), 20(4), . . . , and 20(M) in even-numbered places. Similarly, when viewed from the Z direction, wavelength selective filters 40(1), 40(3), . . . , 40(M−1) in odd-numbered places may be disposed so as to partially overlap wavelength selective filters 40(2), 40(4), . . . , 40(M) in even-numbered places.

A plurality of through holes 74c are formed in side wall 74 of housing 70E. Optical fiber 11 and optical fibers 21 are inserted in through holes 74c. A plurality of projecting portions 75 are formed on an inner surface of side wall 74. As shown in FIG. 25, each two of the plurality of projecting portions 75 form a pair, and projecting portions 75 forming the pair are arranged in the Z direction. An end portion of base plate 50E is inserted between the pair of projecting portions 75, and base plate 50E is fixed to housing 70E in a state in which base plate 50E is spaced apart from bottom plate 73.

Optical element 80 is an element that changes the direction of the optical path, and is a prism in the embodiment. Optical element 80 may be, for example, a mirror. Optical element 80 includes a reflection surface 81 extending along the Y direction. Reflection surface 81 changes the direction of the optical path connecting first collimator 10 and second collimator 20(1) in the first place, and the direction of the optical path connecting wavelength selective filter 40(m) in the mth (m=1, . . . , M−1) place among wavelength selective filters 40(1) to 40(M−1) and second collimator 20(m+1) in the (m+1)th place among second collimators 20(2) to 20(M). First collimator 10, second collimators 20(1) to 20(M), and wavelength selective filters 40(1) to 40(M) are located on the same side with respect to reflection surface 81 when viewed from the Z direction.

When the optical signals $S\lambda_1$ to $S\lambda_m$ are demultiplexed, at first, a wavelength-multiplexed optical signal including the optical signals $S\lambda_1$ to $S\lambda_M$ is output from first collimator 10 and reaches reflection surface 81 of optical element 80. The wavelength-multiplexed optical signal is reflected by reflection surface 81 and reaches wavelength selective filter 40(1). The optical signal $S\lambda_1$ is transmitted through wavelength selective filter 40(1) and is output to the outside of wavelength multiplexer/demultiplexer 1E through second collimator 20(1). The remaining optical signals $S\lambda_2$ to $S\lambda_M$ are reflected by wavelength selective filter 40(1), reflected again by reflection surface 81, and then reach wavelength selective filter 40(2). Thereafter, in the same manner, each optical signal is demultiplexed one by one according to its wavelength up to the optical signal $S\lambda_M$ and output to the outside of wavelength multiplexer/demultiplexer 1E.

When the optical signals $S\lambda_1$ to $S\lambda_M$ are multiplexed, at first, the optical signal $S\lambda_M$ is output from second collimator 20(M) and reaches wavelength selective filter 40(M). The optical signal $S\lambda_M$ is transmitted through wavelength selective filter 40(M) and reaches reflection surface 81. The optical signal $S\lambda_M$ is reflected by reflection surface 81, reaches wavelength selective filter 40(M−1), and is reflected again by wavelength selective filter 40(M−1). At the same time, the optical signal $S\lambda_{M-1}$ reaches wavelength selective filter 40(M−1) from second collimator 20(M−1). The optical signal $S\lambda_{M-1}$ passes through wavelength selective filter 40(M−1) and is multiplexed with the optical signal $S\lambda_M$. Thereafter, the optical signals are sequentially multiplexed up to the optical signal $S\lambda_1$ in the same manner, and a wavelength-multiplexed optical signal is generated. The generated wavelength-multiplexed optical signal reaches reflection surface 81 from wavelength selective filter 40(1), is reflected by reflection surface 81, and then reaches first collimator 10. The wavelength-multiplexed optical signal is output from first collimator 10 to the outside of wavelength multiplexer/demultiplexer 1E.

In this embodiment, wavelength multiplexer/demultiplexer 1E comprises optical element 80 including reflection surface 81 extending along the Y direction when viewed from the Z direction. M-number of second collimators 20(1) to 20(M) and M-number of wavelength selective filters 40(1) to 40(M) are arranged along the Y direction when viewed from the Z direction. First collimator 10, second collimators 20(1) to 20(M), and wavelength selective filters 40(1) to 40(M) are located on the same side with respect to reflection surface 81 when viewed from the Z direction. Reflection surface 81 changes the direction of the optical path connecting first collimator 10 and second collimator 20(1) in the first place and the direction of the optical path connecting wavelength selective filter 40(m) in the mth (m=1, . . . , M−1) place among wavelength selective filters 40(1) to 40(M−1) and second collimator 20(m+1) in the (m+1)th place among second collimators 20(2) to 20(M). Thus, it is possible to reduce the size of wavelength multiplexer/demultiplexer 1E as compared with the case where second collimators 20(1), 20(3), . . . , 20(M−1) and wavelength selective filters 40(1), 40(3), . . . , 40(M−1) in odd-numbered places are arranged to face second collimators 20(2), 20(4), . . . , 20(M) and wavelength selective filters 40(2), 40(4), . . . , 40(M) in even-numbered places.

In this embodiment, the positions of wavelength selective filters 40(1), 40(3), . . . , and 40(M−1) in odd-numbered places are different in the Z direction from the positions of wavelength selective filters 40(2), 40(4), . . . , and 40(M) in even-numbered places. Base plate 50E is disposed between wavelength selective filters 40(1), 40(3), . . . , 40(M−1) in odd-numbered places and wavelength selective filters 40(2), 40(4), . . . , 40(M) in even-numbered places. In this case, when viewed from the Z direction, wavelength selective filters 40(1), 40(3), . . . , 40(M−1) in odd-numbered places can be disposed so as to partially overlap wavelength selective filters 40(2), 40(4), . . . , 40(M) in even-numbered places, and the size of wavelength multiplexer/demultiplexer 1E can be further reduced.

Figure 26:
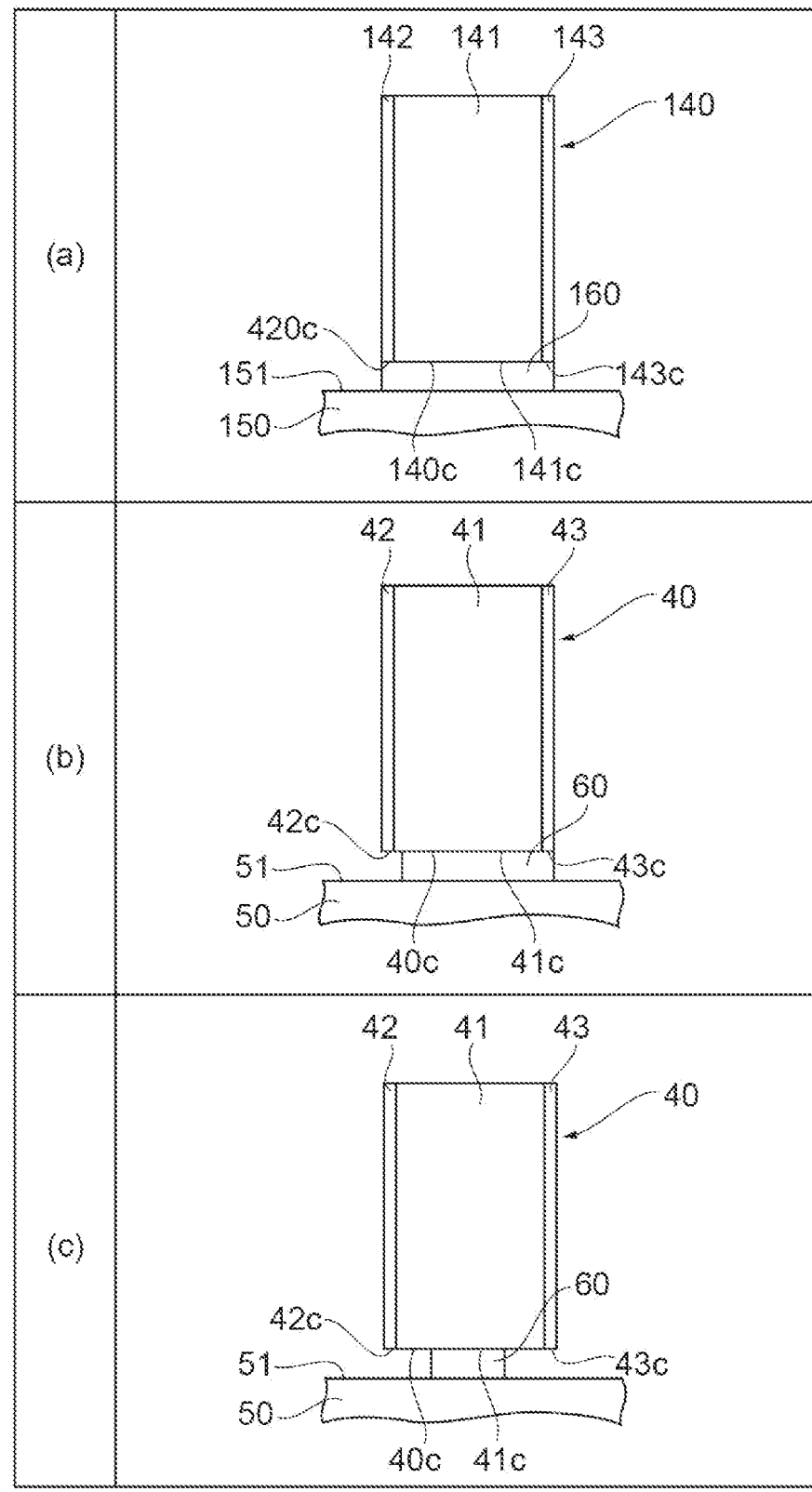
FIG. 26 is a schematic view illustrating contact states showing how a bonding portion contacts a wavelength selective filter.
Figure 27:
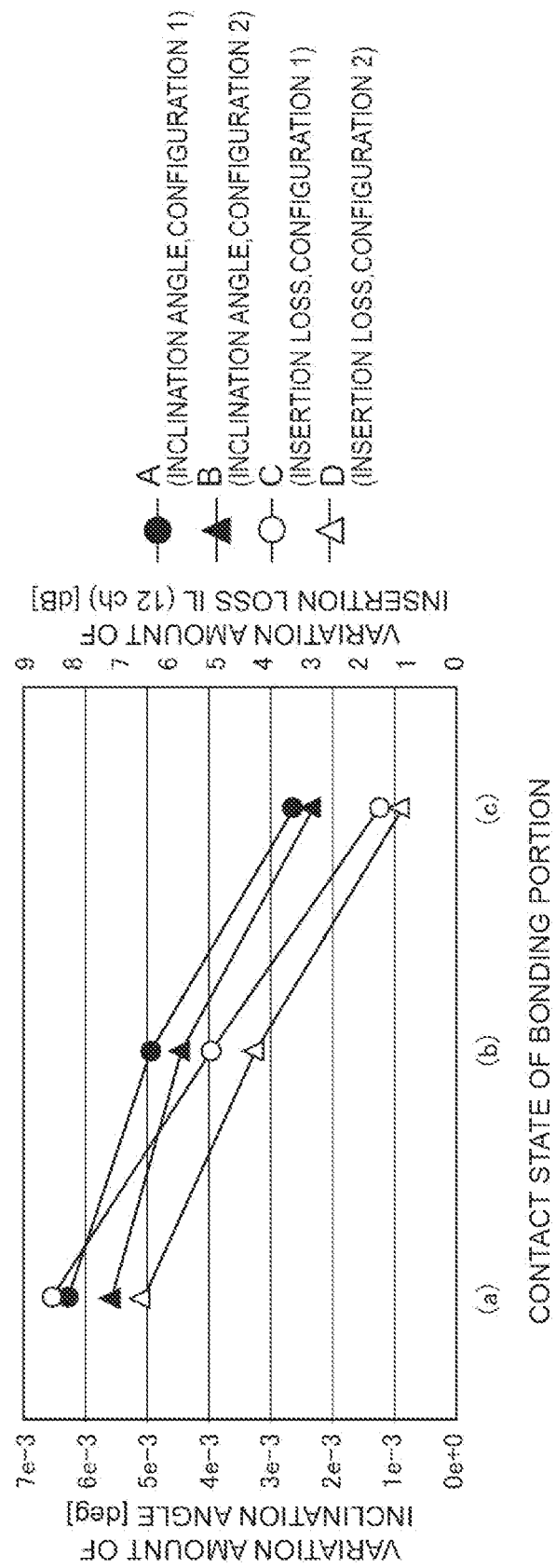
FIG. 27 is a diagram illustrating a relationship between the contact state of a bonding portion, and a variation amount of an inclination angle of a multilayer film and a variation amount of insertion loss.

With reference to FIG. 26 and FIG. 27, a description will be given of the results of simulations relating to variations in the inclination angle of the multilayer film and variations in the insertion loss due to changes in the environmental temperature. In this simulation, when the environmental temperature was changed from 25° C. to 85° C., the variation amount of the inclination angle of the multilayer film and the variation amount of the insertion loss were calculated for wavelength selective filters having different contact states of the bonding portions. FIG. 26 is a schematic diagram illustrating how the bonding portion contacts the wavelength selective filter for three different contact states. FIG. 27 is a diagram illustrating the relationship between the contact state of the bonding portion and the variation amount of the inclination angle and the variation amount of the insertion loss of the wavelength selective filter.

FIG. 26 shows the contact states of the bonding portion with respect to the wavelength selective filter assumed in this simulation. The contact state (a) shown in part (a) in FIG. 26 is a contact state of bonding portion 160 in the conventional wavelength multiplexer/demultiplexer. Wavelength selective filter 140 shown in part (a) in FIG. 26 has the same configuration as wavelength selective filters 40(1) to 40(M) according to the first embodiment described above. In the contact state (a), bonding portion 160 is in contact with an entire bottom surface 140c of wavelength selective filter 140. That is, in the contact state (a), bonding portion 160 is in contact with bottom surface 141c of substrate 141, a third surface 142c of multilayer film 142, and a third surface 143c of antireflection film 143.

Contact state (b) shown in part (b) in FIG. 26 and contact state (c) shown in part (c) in FIG. 26 are contact states of bonding portion 60 according to the present disclosure. Specifically, each of the contact state (b) and the contact state (c) is a state in which bonding portion 60 is in non-contact with multilayer film 42. Wavelength selective filter 40 shown each in part (b) and part (c) in FIG. 26 has the same configuration as wavelength selective filters 40(1) to 40(M) according to the first embodiment. In the contact state (b), bonding portion 60 is in contact with bottom surface 41c of substrate 41 and third surface 43c of antireflection film 43, and is in non-contact with multilayer film 42. In the contact state (b), the contact area of bottom surface 40c of wavelength selective filter 40 with bonding portion 60 is 50% or more of the entire area of bottom surface 40c. In the contact state (c), bonding portion 60 is in contact with bottom surface 41c of substrate 41 and is in non-contact with third surface 42c of multilayer film 42 and third surface 43c of antireflection film 43. In the contact state (c), the contact area of bottom surface 40c of wavelength selective filter 40 with bonding portion 60 is 50% or less of the entire area of bottom surface 40c.

In this simulation, similarly to wavelength multiplexer/demultiplexer 1 according to the first embodiment, the number of wavelength selective filters and the number of second collimators were set to 12 (M=12), and the variation amount of the inclination angle of the multilayer film and the variation amount of the insertion loss IL were calculated when the environmental temperature was changed from room temperature (25° C.) to high temperature (85° C.). The variation amount of the inclination angle of the multilayer film is a difference between the angle of the multilayer film with respect to the placement surface under the room temperature environment and the angle of the multilayer film with respect to the placement surface under the high temperature environment. The variation amount of the insertion loss IL was calculated based on the value of the insertion loss at the channel port corresponding to second collimator 20(12) in the twelfth place.

In this simulation, multilayer films having two types of configurations (configuration 1 and configuration 2) with different materials and the like were assumed. Graph A of FIG. 27 is a graph illustrating the variation amount of the inclination angle of the wavelength selective filter including the multilayer film of configuration 1, and graph B is a graph illustrating the variation amount of the inclination angle of the wavelength selective filter including the multilayer film of configuration 2. Graph C in FIG. 27 is a graph illustrating the variation amount of the insertion loss IL when the wavelength selective filter including the multilayer film of the configuration 1 is used, and graph D is a graph illustrating the variation amount of the insertion loss IL when the wavelength selective filter including the multilayer film of the configuration 2 is used. In FIG. 27, the horizontal axis represents the contact state of the bonding portion, and the vertical axis represents the variation amount of the inclination angle (unit: deg.) and the variation amount of the insertion loss IL (unit: dB).

As shown in FIG. 27, the variation of the inclination angle of multilayer film 42 and the variation of the insertion loss IL are smaller in the contact state (b) and the contact state (c) than in the contact state (a). Specifically, in the contact state (b), the variation amount of the inclination angle is smaller by about 20%, and the variation amount of the insertion loss IL is smaller by about 40% as compared with the contact state (a). In the contact state (c), the variation amount of the inclination angle is smaller by about 60% and the variation amount of the insertion loss IL is smaller by about 80% as compared with the contact state (a). From the results of this simulation, it can be confirmed that, when the environmental temperature changes, the variation amount of the inclination angle of multilayer film 42 and the variation amount of the insertion loss IL are reduced by adopting the contact state in which bonding portion 60 is in non-contact with multilayer film 42. Further, from the results of the contact state (b) and the contact state (c) in the simulation, it can be confirmed that the smaller the ratio of the contact area of bonding portion 60 to the entire area of bottom surface 40c of wavelength selective filter 40, the smaller the variation amount of the inclination angle of multilayer film 42 and the variation amount of the insertion loss IL when the environmental temperature changes.

Although the embodiments of the present disclosure have been described in detail, the present disclosure is not limited to the above embodiments and may be applied to various embodiments. For example, in each of the above embodiments, bonding portion 60 is a single integrally formed bonding portion, but bonding portion 60 may be configured by a plurality of separate bonding portions.

Although multilayer film 42 is formed on the entire first main surface 41a of substrate 41 in the first embodiment, first main surface 41a may include an exposed region on which multilayer film 42 is not formed. In this case, bonding portion 60 may be in contact with the exposed region of first main surface 41*a*.

In the sixth embodiment (see FIG. 24), optical element 80 is a single integrally formed optical element, but optical element 80 may be composed of a plurality of optical elements. In this case, a plurality of optical elements may be arranged along the Y direction.

In the above embodiments, the wavelength selective filter is a DWDM filter, however, the wavelength selective filter may be a filter having an arbitrary wavelength interval such as a coarse wavelength division multiplexing (CWDM) filter.

What is claimed is:

1. A wavelength multiplexer/demultiplexer comprising:
    a first collimator including a first optical waveguide and a collimating lens optically coupled to an end portion of the first optical waveguide;
    M-number (M is an integer of 2 or more) of second collimators each including a second optical waveguide and a collimating lens optically coupled to an end portion of the second optical waveguide;
    M-number of wavelength selective filters configured to transmit optical signals in mutually differing transmission wavelength bands, and reflect optical signals in wavelength bands other than each transmission wavelength band; and
    a base plate including a placement surface on which the M-number of wavelength selective filters are placed,
    wherein an optical path connecting the first collimator and a first second collimator among the M-number of second collimators is configured to pass through a first wavelength selective filter of the M-number of wavelength selective filters,
    wherein an optical path connecting an mth (m=1, ..., M−1) wavelength selective filter among the M-number of wavelength selective filters and an (m+1)th second collimator among the M-number of second collimators is configured to pass through an (m+1)th wavelength selective filter among the M-number of wavelength selective filters,
    wherein each of the M-number of wavelength selective filters includes a substrate having optical transparency and a multilayer film, and is fixed to the placement surface by a cured adhesive, the substrate includes a first main surface and a second main surface opposite to each other in a first direction, and a bottom surface connecting the first main surface and the second main surface and facing the placement surface, and the multilayer film is formed on the first main surface and is configured to transmit an optical signal in a specific transmission wavelength band and reflect an optical signal in a wavelength band other than the specific transmission wavelength band,
    wherein the cured adhesive is in contact with the bottom surface and is in non-contact with the multilayer film in at least one wavelength selective filter of the M-number of wavelength selective filters,
    wherein the substrate includes a first side surface and a second side surface opposite to each other in a second direction intersecting the first direction, and
    wherein the cured adhesive is in contact with at least one of the first side surface and the second side surface in the at least one wavelength selective filter.

2. The wavelength multiplexer/demultiplexer according to claim 1,
    wherein the first main surface includes an exposed region in which the multilayer film is not formed, and
    wherein the cured adhesive is in contact with the exposed region.

3. The wavelength multiplexer/demultiplexer according to claim 2,
    wherein the first main surface includes a first part opposite to the second main surface in the first direction, and a second part inclined with respect to the first part and the bottom surface and connecting the first part and the bottom surface, and
    wherein the second part includes the exposed region.

4. The wavelength multiplexer/demultiplexer according to claim 2,
    wherein a part of the cured adhesive in contact with the exposed region is positioned to be separated from a center of the first main surface by 300 μm or more when viewed in the first direction.

5. The wavelength multiplexer/demultiplexer according to claim 1,
    wherein the cured adhesive is a cured material of an adhesive including an ultraviolet curable resin.

6. The wavelength multiplexer/demultiplexer according to claim 1,
    wherein the cured adhesive is a cured material of an adhesive including a silica filler.

7. The wavelength multiplexer/demultiplexer according to claim 6,
    wherein a content of the silica filler with respect to a volume of the adhesive is 50% by volume or more.

8. The wavelength multiplexer/demultiplexer according to claim 1,
    wherein a gap between the bottom surface and the placement surface is 50 μm or more.

9. The wavelength multiplexer/demultiplexer according to claim 1,
    wherein a coefficient of linear expansion of the base plate is $15.0 \times 10^{-6}$ (1/K) or less.

10. The wavelength multiplexer/demultiplexer according to claim 1, further comprising:
    a third collimator optically coupled to an Mth wavelength selective filter of the M-number of wavelength selective filters.

11. The wavelength multiplexer/demultiplexer according to claim 1, further comprising:
    an optical element including a reflection surface extending in a predetermined direction when viewed in a thickness direction of the base plate,
    wherein the M-number of second collimators and the M-number of wavelength selective filters are each arranged in the predetermined direction when viewed in the thickness direction of the base plate,
    wherein the first collimator, the M-number of second collimators, and the M-number of wavelength selective filters are positioned on a same side with respect to the reflection surface when viewed in the thickness direction of the base plate, and
    wherein the reflection surface changes a direction of the optical path connecting the first collimator and the first second collimator and a direction of the optical path connecting the mth (m=1, ..., M−1) wavelength selective filter and the (m+1)th second collimator.

12. The wavelength multiplexer/demultiplexer according to claim 11,
    wherein a position of an odd-numbered wavelength selective filter among the M-number of wavelength selective filters differs from a position of an even-numbered wavelength selective filter among the M-number of wavelength selective filters in the thickness direction of the base plate, and wherein the base plate is disposed between the odd-numbered wavelength selective filter and the even-numbered wavelength selective filter.

13. The wavelength multiplexer/demultiplexer according to claim 1,
wherein the at least one wavelength selective filter includes at least any one of a first to (M/2)th wavelength selective filters.

14. The wavelength multiplexer/demultiplexer according to claim 1,
wherein a number of the at least one wavelength selective filter is M/2 or more.

15. The wavelength multiplexer/demultiplexer according to claim 1,
wherein the base plate includes a first base plate on which the M-number of wavelength selective filters are placed, and a second base plate on which the first collimator and the M-number of second collimators are placed, the second base plate being a body separated from the first base plate.

16. The wavelength multiplexer/demultiplexer according to claim 1, further comprising:
a housing having an internal space in which the first collimator, the M-number of second collimators, the M-number of wavelength selective filters, and the base plate are housed, wherein the internal space is sealed.

17. A wavelength multiplexer/demultiplexer comprising:
a first collimator including a first optical waveguide and a collimating lens optically coupled to an end portion of the first optical waveguide;
M-number (M is an integer of 2 or more) of second collimators each including a second optical waveguide and a collimating lens optically coupled to an end portion of the second optical waveguide;
M-number of wavelength selective filters configured to transmit optical signals in mutually differing transmission wavelength bands, and reflect optical signals in wavelength bands other than each transmission wavelength band; and
a base plate including a placement surface on which the M-number of wavelength selective filters are placed,
wherein an optical path connecting the first collimator and a first second collimator among the M-number of second collimators is configured to pass through a first wavelength selective filter of the M-number of wavelength selective filters, wherein an optical path connecting an mth (m=1, ..., M−1) wavelength selective filter among the M-number of wavelength selective filters and an (m+1)th second collimator among the M-number of second collimators is configured to pass through an (m+1)th wavelength selective filter among the M-number of wavelength selective filters, wherein each of the M-number of wavelength selective filters includes a substrate having optical transparency and a multilayer film, and is fixed to the placement surface by a cured adhesive, the substrate includes a first main surface and a second main surface opposite to each other in a first direction, and a bottom surface connecting the first main surface and the second main surface and facing the placement surface, and the multilayer film is formed on the first main surface and is configured to transmit an optical signal in a specific transmission wavelength band and reflect an optical signal in a wavelength band other than the specific transmission wavelength band, wherein the cured adhesive is in contact with the bottom surface and is in non-contact with the multilayer film in at least one wavelength selective filter of the M-number of wavelength selective filters, wherein each of the M-number of wavelength selective filters includes an antireflection film formed on the second main surface and configured to prevent an optical signal from being reflected by the second main surface, and wherein the cured adhesive is in contact with a surface of the antireflection film facing the placement surface in the at least one wavelength selective filter.

18. The wavelength multiplexer/demultiplexer according to claim 17,
wherein the cured adhesive is in contact with a surface of the antireflection film opposite to the second main surface in the at least one wavelength selective filter.

19. The wavelength multiplexer/demultiplexer according to claim 17,
wherein a part of the cured adhesive in contact with the antireflection film is positioned to be separated from a center of the second main surface by 300 μm or more when viewed in the first direction.

* * * * *